US006996997B2

(12) United States Patent
Wiff et al.

(10) Patent No.: US 6,996,997 B2
(45) Date of Patent: Feb. 14, 2006

(54) PRE-TRIP DIAGNOSTIC METHODS FOR A TEMPERATURE CONTROL UNIT

(75) Inventors: James W. Wiff, Cologne, MN (US); Jay. L. Hanson, Bloomington, MN (US); Bill A. Carlson, Cottage Grove, MN (US)

(73) Assignee: Thermo King Corporation, Minneapolis, MN (US)

(*) Notice: Subject to any disclaimer, the term of this patent is extended or adjusted under 35 U.S.C. 154(b) by 32 days.

(21) Appl. No.: 10/382,161

(22) Filed: Mar. 5, 2003

(65) Prior Publication Data

US 2004/0172954 A1    Sep. 9, 2004

(51) Int. Cl.
F25B 49/02          (2006.01)
(52) U.S. Cl. .......................................... 62/127; 62/129
(58) Field of Classification Search ................... 62/125, 62/126, 127, 129, 130, 131; 165/11.1, 11.2; 236/94
See application file for complete search history.

(56) References Cited

U.S. PATENT DOCUMENTS

| 4,172,493 | A | 10/1979 | Jacobs |
| 4,344,294 | A | 8/1982 | Gelbard |
| 4,493,191 | A | 1/1985 | Hanson |
| 4,512,295 | A | 4/1985 | Hanson |
| 4,537,045 | A | 8/1985 | Mayer |
| 4,646,529 | A | 3/1987 | Hanson |
| 4,663,725 | A | 5/1987 | Truckenbrod et al. |
| 4,782,800 | A | 11/1988 | Hanson |
| 4,790,143 | A | 12/1988 | Hanson |
| 4,819,441 | A | 4/1989 | Hanson |
| 4,878,465 | A | 11/1989 | Hanson et al. |
| 4,899,549 | A | 2/1990 | Berge et al. |
| 4,903,498 | A | 2/1990 | Hanson |
| 4,903,500 | A | 2/1990 | Hanson |
| 4,903,502 | A | 2/1990 | Hanson et al. |
| 4,912,940 | A | 4/1990 | Anderson et al. |
| 4,918,932 | A | 4/1990 | Gustafson et al. |
| 4,949,550 | A | 8/1990 | Hanson |
| 4,977,751 | A | 12/1990 | Hanson |

(Continued)

FOREIGN PATENT DOCUMENTS

JP        1223013        9/1989

(Continued)

Primary Examiner—Harry B. Tanner
(74) Attorney, Agent, or Firm—Michael Best & Friedrich LLP

(57) ABSTRACT

Methods of diagnosing a temperature control unit and methods of performing a diagnostic check on a temperature control unit. The methods generally include monitoring at least one function of the temperature control unit, storing information relating to the at least one monitored function, determining from the information relating to the at least one monitored function whether the unit has a malfunction. Some methods generally include setting a flag to one of a first setting and a second setting, the flag being set to the first setting if the unit has no malfunction and the flag being set to the second setting if the unit has at least one malfunction, and enabling the diagnostic check when the flag is set to the first setting. Some methods generally include enabling at least one of a first diagnostic check and a second diagnostic check on the unit, the first diagnostic check being enabled if the unit has no malfunction and the second diagnostic check being enabled whether the unit has no malfunction or at least one malfunction, wherein the first diagnostic check consumes a shorter period of time to successfully complete than the second diagnostic check.

30 Claims, 13 Drawing Sheets

U.S. PATENT DOCUMENTS

| | | | |
|---|---|---|---|
| 4,977,752 A | 12/1990 | Hanson | |
| 5,103,783 A | 4/1992 | Hanson et al. | |
| 5,118,038 A | 6/1992 | Shimizu et al. | |
| 5,123,251 A | 6/1992 | Hanson | |
| 5,123,252 A | 6/1992 | Hanson | |
| 5,123,253 A | 6/1992 | Hanson et al. | |
| 5,140,825 A | 8/1992 | Hanson et al. | |
| 5,140,826 A | 8/1992 | Hanson et al. | |
| 5,161,383 A | 11/1992 | Hanson et al. | |
| 5,161,384 A | 11/1992 | Hanson et al. | |
| 5,172,560 A | 12/1992 | Jurewicz et al. | |
| 5,172,561 A | 12/1992 | Hanson et al. | |
| 5,181,389 A | 1/1993 | Hanson et al. | |
| 5,186,015 A | 2/1993 | Roehrich et al. | |
| 5,197,670 A | 3/1993 | Hanson et al. | |
| 5,201,185 A | 4/1993 | Hanson et al. | |
| 5,201,186 A | 4/1993 | Hanson | |
| 5,222,368 A | 6/1993 | Hanson | |
| 5,249,429 A | 10/1993 | Hanson | |
| 5,257,506 A | 11/1993 | DeWolf et al. | |
| 5,275,011 A | 1/1994 | Hanson et al. | |
| 5,284,024 A | 2/1994 | Hanson et al. | |
| 5,287,705 A | 2/1994 | Roehrich et al. | |
| 5,291,745 A | 3/1994 | Hanson | |
| 5,303,560 A | 4/1994 | Hanson et al. | |
| 5,317,998 A | 6/1994 | Hanson et al. | |
| 5,323,385 A | 6/1994 | Jurewicz et al. | |
| 5,331,821 A | 7/1994 | Hanson et al. | |
| 5,363,669 A | 11/1994 | Janke et al. | |
| 5,369,957 A | 12/1994 | Hanson | |
| 5,369,962 A | 12/1994 | Szynal et al. | |
| 5,377,493 A | 1/1995 | Friedland | |
| 5,423,190 A | 6/1995 | Friedland | |
| 5,424,720 A | 6/1995 | Kirkpatrick | |
| 5,437,163 A | 8/1995 | Jurewicz et al. | |
| 5,438,841 A | 8/1995 | O'Brien et al. | |
| 5,440,893 A | 8/1995 | Davis et al. | |
| 5,454,229 A | 10/1995 | Hanson et al. | |
| 5,456,088 A | 10/1995 | Hanson et al. | |
| 5,458,188 A | 10/1995 | Roehrich et al. | |
| 5,469,715 A | 11/1995 | Janke et al. | |
| 5,493,867 A | 2/1996 | Szynal et al. | |
| 5,499,512 A | 3/1996 | Jurewicz et al. | |
| 5,507,154 A | 4/1996 | Grant | |
| 5,515,689 A | 5/1996 | Atterbury | |
| 5,515,693 A * | 5/1996 | O'Brien et al. | 62/179 |
| 5,524,449 A | 6/1996 | Ueno et al. | |
| 5,530,647 A | 6/1996 | Sem et al. | |
| 5,530,885 A | 6/1996 | Kagohata | |
| 5,533,360 A | 7/1996 | Szynal et al. | |
| 5,557,938 A | 9/1996 | Hanson et al. | |
| 5,557,941 A | 9/1996 | Hanson et al. | |
| 5,564,285 A | 10/1996 | Jurewicz et al. | |
| 5,579,648 A | 12/1996 | Hanson et al. | |
| 5,596,878 A | 1/1997 | Hanson et al. | |
| 5,634,347 A | 6/1997 | Hanson et al. | |
| 5,730,216 A | 3/1998 | Viegas et al. | |
| 5,775,415 A | 7/1998 | Yoshimi et al. | |
| 5,778,690 A | 7/1998 | Hanson et al. | |
| 5,977,647 A | 11/1999 | Lenz et al. | |
| 6,037,864 A | 3/2000 | Sem et al. | |
| 6,067,805 A | 5/2000 | Porter et al. | |
| 6,164,367 A | 12/2000 | Kurahashi et al. | |
| 6,176,095 B1 | 1/2001 | Porter | |
| 6,205,800 B1 | 3/2001 | Topper et al. | |
| 6,233,952 B1 | 5/2001 | Porter et al. | |
| 6,263,686 B1 | 7/2001 | Burkhart | |
| 6,367,269 B1 | 4/2002 | Hanson et al. | |
| 6,470,697 B1 | 10/2002 | Nakamura et al. | |
| 6,609,388 B1 | 8/2003 | Hanson | |
| 6,679,074 B1 | 1/2004 | Hanson | |
| 6,708,507 B1 | 3/2004 | Sem et al. | |
| 2003/0024256 A1 | 2/2003 | Hanson | |
| 2003/0070443 A1 | 4/2003 | Hanson et al. | |
| 2003/0163225 A1 | 8/2003 | Hanson | |
| 2003/0202557 A1 | 10/2003 | Hanson et al. | |
| 2004/0172954 A1 | 9/2004 | Hanson et al. | |

FOREIGN PATENT DOCUMENTS

| | | |
|---|---|---|
| JP | 8268032 | 10/1996 |

\* cited by examiner

PRE-TRIP DIAGNOSTIC METHODS FOR A TEMPERATURE CONTROL UNIT

FIELD OF THE INVENTION

The present invention relates to diagnostic methods for temperature control units and, more particularly, to pre-trip diagnostic methods for a transport temperature control unit.

BACKGROUND

Temperature control units are used in a wide variety of applications to cool, heat, or otherwise condition a conditioned space within an enclosure. Temperature sensitive products are placed in the conditioned space and are maintained at appropriate temperatures by the temperature control unit.

Prior to loading temperature sensitive products into the conditioned space, an operator or user may find it desirable to run diagnostic checks on the temperature control unit to ensure that the unit is operating correctly. The diagnostic checks can catch any unit malfunctions that could cause the temperature sensitive products to be spoiled, melted, or otherwise lost. After the diagnostic checks have indicated that the temperature control unit is operating correctly, the operator or user can load the temperature sensitive products into the conditioned space.

One type of application in which a temperature control unit is utilized is in a transportable vehicle or transport vehicle that transports temperature sensitive products. In this application, the temperature control unit is known as a transport temperature control unit and conditions a conditioned space within a trailer of the transport vehicle. The transport vehicle also includes a tractor connected to the trailer for transporting the trailer and temperature sensitive products.

Prior to loading the conditioned space of the trailer with temperature sensitive products, diagnostic checks are run on the transport temperature control unit to determine if the unit is malfunctioning in any way. For transport applications, the diagnostic checks are referred to as a "pre-trip". Pre-trips typically test many aspects of the transport temperature control unit and can consume a great amount of time. Operators or users typically do not load the conditioned space with the temperature sensitive products until the pre-trip has finished and determined that the unit has no malfunctions.

SUMMARY OF THE INVENTION

A diagnostic method or pre-trip that takes less time would be welcomed by users of temperature control units and transport temperature control units. The present invention provides a method of performing a diagnostic check on a temperature control unit, the method generally includes monitoring at least one function of the unit, storing the at least one function of the unit, determining from the at least one function whether the unit has at least one malfunction, setting a flag to one of a first setting and a second setting, the flag being set to the first setting if the unit has no malfunction and the flag being set to the second setting if the unit has at least one malfunction, and initiating the diagnostic check when the flag is set to the first setting.

The present invention also provides a method of diagnosing a temperature control unit, the method generally includes monitoring at least one function of the unit, storing the at least one function of the unit, determining from the at least one function whether the unit has at least one malfunction, and initiating one of a first diagnostic check and a second diagnostic check on the unit, the first diagnostic check being initiated if the unit has no malfunction and the second diagnostic check being initiated if the unit has at least one malfunction, wherein the first diagnostic check consumes a shorter period of time to successfully complete than the second diagnostic check.

The present invention further provides a method of diagnosing a temperature control unit, the method generally including initiating a first operation of the unit, monitoring at least one function of the unit during the first operation, storing the at least one function from the first operation, analyzing the at least one function from the first operation, terminating the first operation of the unit, initiating one of a first diagnostic check and a second diagnostic check based on the analysis of the at least one function from the first operation, terminating the one of the first diagnostic check and second diagnostic check, and initiating a second operation of the unit after the termination of the one of the first diagnostic check and the second of the diagnostic check if the one of the first diagnostic check and the second diagnostic check determines that the unit does not have a malfunction.

Figure 1:
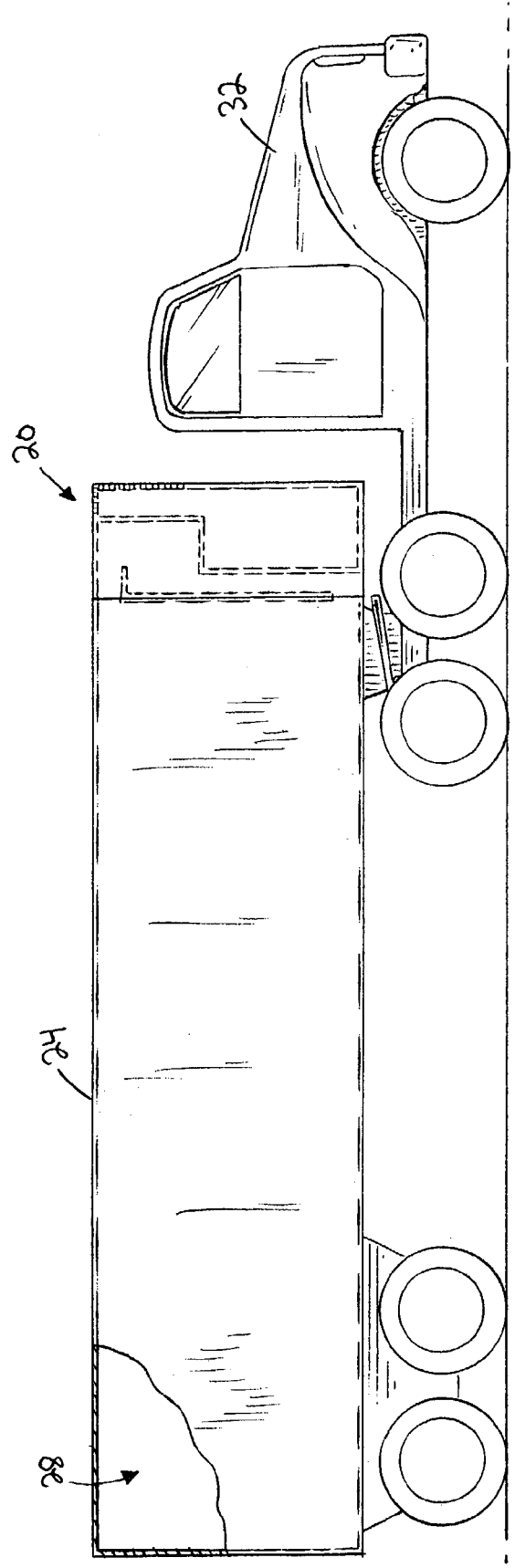
FIG. 1 is a side view, partially in section, of a transport vehicle having a transport temperature control unit.

Before an embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting. The use of "including", "comprising" and "having" and variations thereof herein is meant to encompass the items listed thereafter and equivalents thereof as well as additional items.

DETAILED DESCRIPTION OF THE DRAWINGS

Figure 2:
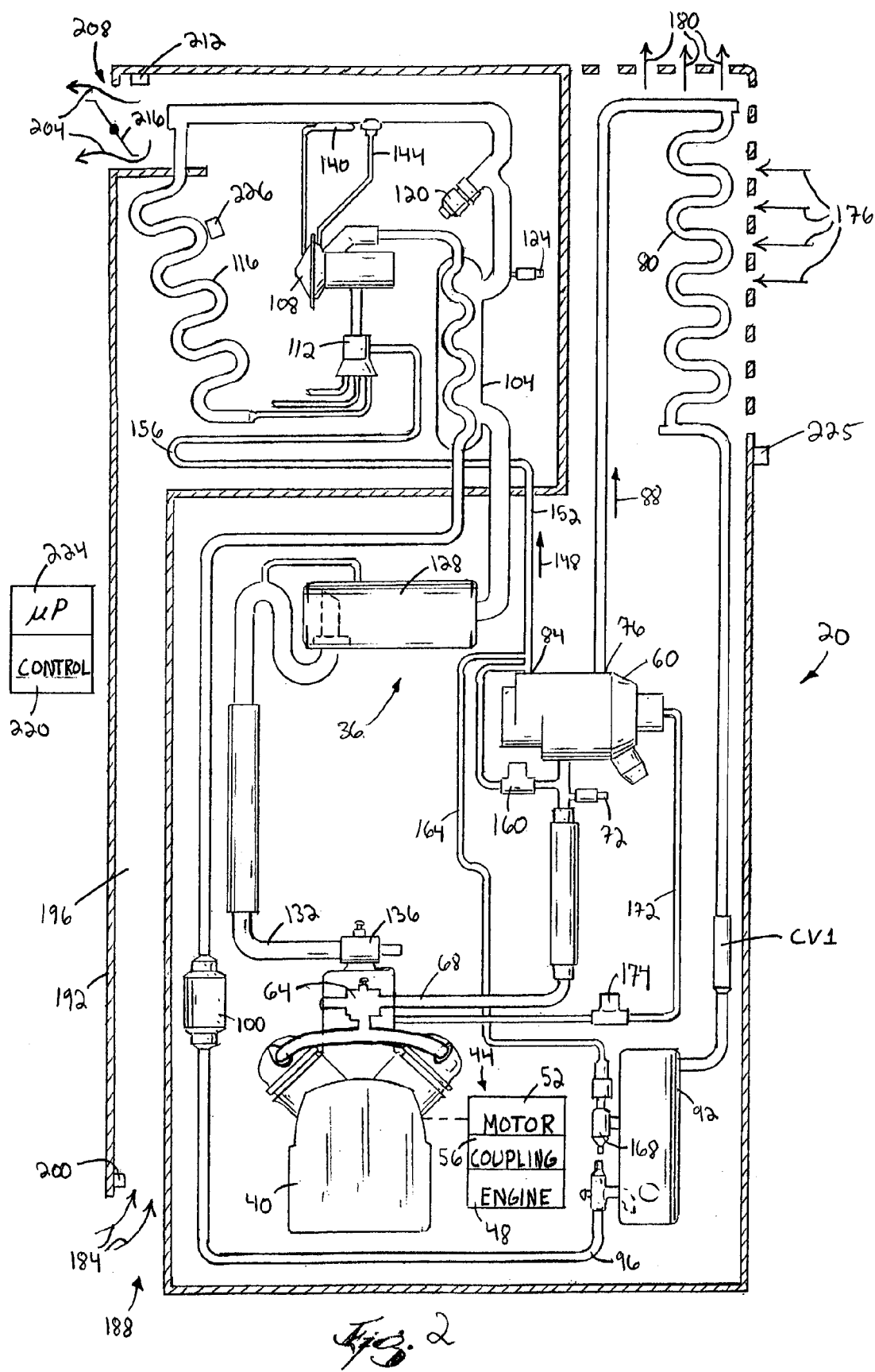
FIG. 2 is a schematic representation of the transport temperature control unit in FIG. 1.

Referring to FIGS. 1 and 2, there is shown a temperature control unit 20 utilizing the present inventive method. The temperature control unit 20 described herein is for example purposes only and is not meant to be limiting. The present inventive method may be used in other temperature control units and still fall within the spirit and scope of the present invention. The temperature control unit 20 is suitable for use in transport applications and may be mounted on a container, truck, trailer, or any other type of transport vehicle that includes a conditioned space that requires maintenance of a predetermined temperature in order to preserve the quality of the cargo. FIG. 1 shows the unit 20 mounted on a trailer 24 having a conditioned space 28. The trailer 24 is pulled by a tractor 32, as is understood by those skilled in the art.

The temperature control unit 20 controls the temperature in the conditioned space 28 and maintains the temperature within a specified temperature range adjacent to a selected thermal setpoint. The conditioned space 28 may also be divided into a plurality of conditioned spaces having differing respective temperatures in each conditioned space. Each respective temperature being substantially independently controlled by the temperature control unit 20. As seen in FIG. 2, the temperature control unit 20 has a closed fluid refrigerant circuit or flow path 36 that includes a refrigerant compressor 40 driven by a prime mover arrangement 44. The prime mover arrangement 44 of an embodiment of the present invention includes an internal combustion engine 48 and an optional stand-by electric motor 52. The engine 48 and the motor 52, when both are utilized, are coupled to the compressor 40 by a suitable clutch or coupling 56 which disengages the engine 48 while the motor 52 is operative. Again, the specific arrangement of parts and structures of the temperature control unit 20 may vary and still fall within the spirit and scope of the present invention.

Discharge ports of the compressor 40 are connected to an inlet port of a three-way valve 60 via a discharge service valve 64 and a discharge line 68. A discharge pressure transducer 72 is located in the discharge line 68 upstream of the three-way valve 60 to measure the discharge pressure of the compressed refrigerant. The functions of the three-way valve 60, which selects heating and cooling cycles, may be provided by two separate valves, if desired. The three-way valve 60 has a first outlet port 76, which is selected to initiate a cooling cycle, connected to the inlet side of a condenser coil 80. The three-way valve 60 also has a second outlet port 84, which is selected to initiate a heating cycle.

When the three-way valve 60 selects the cooling cycle outlet port 76, it connects the compressor 40 in a first refrigerant flow path 88, which in addition to the condenser coil 80 includes a one-way condenser check valve CVI, a receiver 92, a liquid line 96, a refrigerant drier 100, a heat exchanger 104, an expansion valve 108, a refrigerant distributor 112, an evaporator coil 116, an electronic throttling valve 120, a suction pressure transducer 124, another path through the heat exchanger 104, an accumulator 128, a suction line 132, and returns to a suction port of compressor 40 via a suction line service valve 136. The expansion valve 108 is controlled by a thermal bulb 140 and an equalizer line 144.

When the three-way valve 60 selects the heating cycle outlet port 84, it connects the compressor 40 in a second refrigerant flow path 148. The second refrigerant flow path 148 by-passes the condenser coil 80 and the expansion valve 108, connecting the hot gas output of compressor 40 to the refrigerant distributor 112 via a hot gas line 152 and a defrost pan heater 156. A hot gas by-pass solenoid valve 160 may optionally be disposed to inject hot gas into the hot gas line 152 during a cooling cycle. A by-pass or pressurizing line 164 connects the hot gas line 152 to the receiver 92 via by-pass and check valves 168, to force refrigerant from the receiver 92 into an active refrigerant flow path during heating and defrost cycles.

A conduit or line 172 connects the three-way valve 60 to the low pressure side of the compressor 40 via a normally closed pilot solenoid valve 174. When the solenoid valve 174 is de-energized, and thus closed, the three-way valve 60 is spring biased to select the cooling cycle outlet port 76. When the evaporator coil 116 requires defrosting, or when cargo is being conditioned in the conditioned space 28 and requires heat to maintain thermal setpoint, the pilot solenoid valve 174 is energized and the low pressure side of the compressor 40 operates the three-way valve 60 to select the heating cycle outlet port 84 to initiate a heating cycle or a defrost cycle.

A condenser fan or blower (not shown), which may be driven by the prime mover arrangement 44, causes ambient air 176 to flow through the condenser coil 80, with the resulting heated air 180 being discharged to the atmosphere. An evaporator fan or blower (also not shown), which also may be driven by the prime mover arrangement 44, draws air 184, called "return air", from the conditioned space 28, through an inlet 188 in a bulkhead 192 and up through a bulkhead space 196. The bulkhead 192 preferably runs substantially the entire height of the conditioned space 28. A return air temperature sensor 200 samples the air temperature from the return air as it is drawn into the bulkhead 192.

The resulting conditioned cooled or heated air 204, called "discharge air", is returned or discharged by a fan (not shown) into the conditioned space 28 via an outlet 208. A discharge air temperature sensor 212 samples the air temperature of the discharge air. During an evaporator defrost cycle, a defrost damper 216 may be operated to close the discharge air path to the conditioned space 28.

The transport temperature control unit 20 is controlled by an electrical control 220 which includes a microprocessor based controller 224 and electrical control circuits and components, including relays, solenoids, and the like. The controller 224 receives input signals from appropriate sensors, including inputs from a thermal setpoint selector (not shown), which may be actuated to select the desired temperature in the conditioned space 28, the return air temperature sensor 200, the discharge temperature sensor 212, the discharge pressure transducer 72, the suction pressure transducer 124, an ambient air temperature sensor 225 disposed to sense the ambient air temperature, and an evaporator coil temperature sensor 226 disposed to sense the temperature of the evaporator coil 116. The controller 224 provides output signals to, among other things, the electronic throttling valve 120 to control the positioning of the electronic throttling valve 120, as described above. The controller 224 also has a computer program stored therein and performs operations based on the computer program as will be discussed further herein.

The present invention in the form of a computer program illustrated in the flowcharts of FIGS. 3A–3D and 4A–4E performs a diagnostic pre-trip on temperature control units. For illustration and description purposes, the present invention is illustrated and described with respect to the unit 20, however, the present invention may be used with other types of temperature control units and still fall within the spirit and scope of the present invention. A pre-trip is an operation performed on the unit 20 to check predetermined functions of the unit 20, and to determine if any of the functions are faulty, below capacity, or otherwise malfunctioning, prior to the trailer 24 disembarking on a trip. Functions of the temperature control units are known to those skilled in the art and can be, for example, any operation of the unit, any operating performance of the unit, any component of the unit, and the like. The pre-trip is typically performed on the unit 20 prior to loading the trailer 24 with temperature sensitive products.

The pre-trip performed by the present invention is a shortened pre-trip or short pre-trip designed to decrease the period of time consumed by a pre-trip. The short pre-trip relies on unit data from past operations and effectively shortens the pre-trip if the past unit data is acceptable. The flowchart illustrated in FIGS. 3A–3D is a first portion of an embodiment of the present invention in the form of a computer program that can be used to practice the method. Generally in this flowchart, the program monitors unit operation and sets a short pre-trip flag "true" or "not-true" depending on the operation of the unit. If the unit is operating satisfactorily without any malfunctions, the program sets the short pre-trip flag "true" and short pre-trip is enabled (discussed in greater detail below). If the unit is not operating properly and has at least one malfunction, the program sets the short pre-trip flag "not-true" and short pre-trip is disabled (discussed in greater detail below). The flowchart illustrated in FIGS. 4A–4E is a second portion of an embodiment of the present invention in the form of a computer program that can be used to practice the method. Generally in this flowchart, the program performs the short pre-trip by performing a cooling check and a heating check on the unit 20. For the program to perform the short pre-trip, the short pre-trip flag must be set "true" by the program. In other words, for the program to perform the short pre-trip illustrated in the flowchart of FIGS. 4A–4E, the short pre-trip flag must be set true by the program in the flowchart illustrated in FIGS. 3A–3D.

Figure 3A:
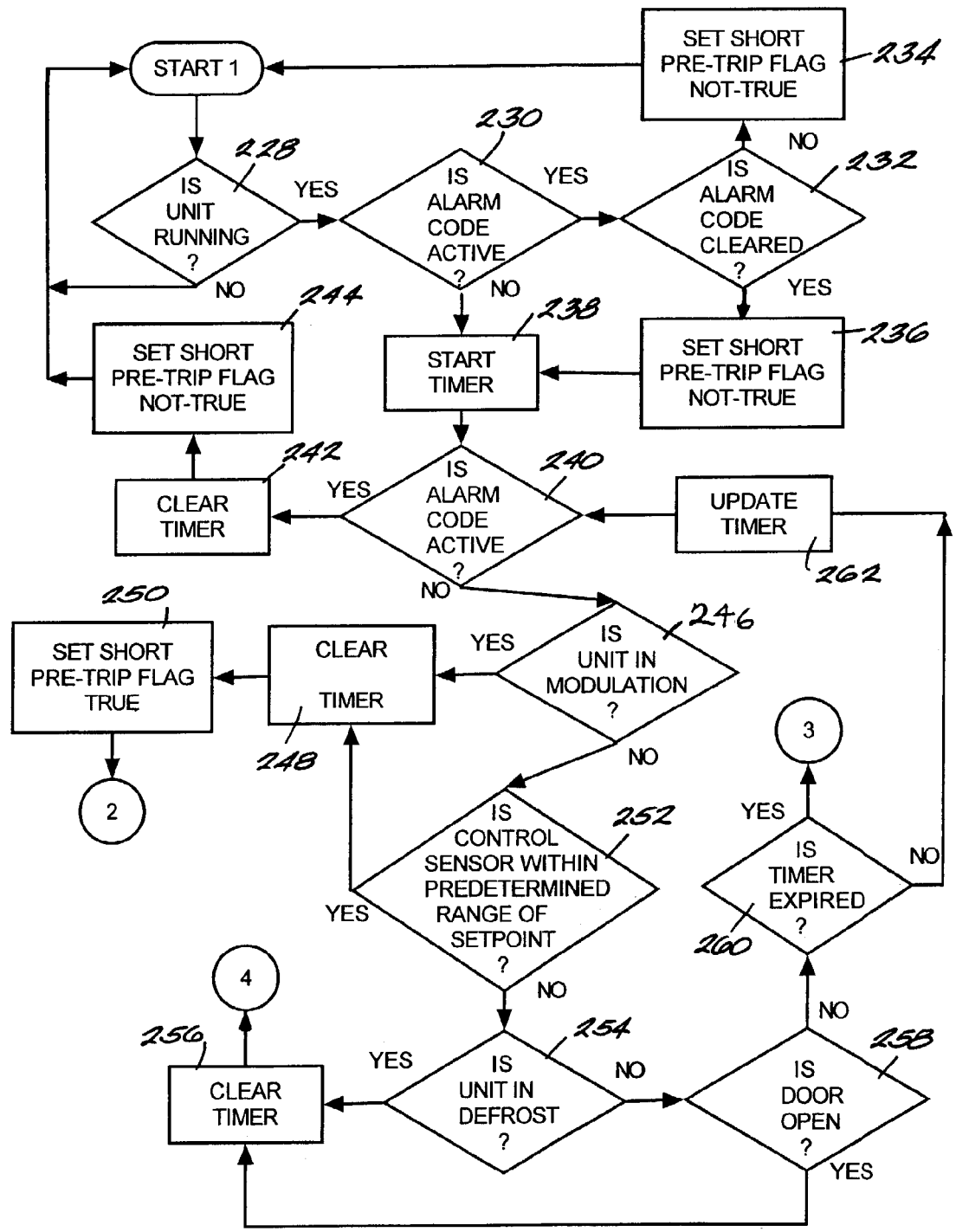
FIGS. 3A–3D show a flow chart illustrating a first portion of an embodiment of diagnostic method for a temperature control unit in the form of a computer program according to the present invention.

Referring to FIGS. 3A–3D, the first portion of an embodiment of the present inventive method will be discussed. Referring to FIG. 3A, the program begins at block START 1. After block START 1, the program proceeds to block 228 where it determines if the unit 20 is running. If the unit 20 is not running (NO at block 228), the program returns to block START 1. If the unit 20 is running (YES at block 228), the program proceeds to block 230 where it determines if an alarm code is active. An alarm code can be any of a variety of types of alarms activated by a malfunction in the unit 20. For example, a malfunction that may activate an alarm code may be a faulty temperature sensor, faulty compressor, blocked refrigerant flow path, etc. Alarm codes are known to those skilled in the art and will not be discussed in greater detail herein. If an alarm code is active (YES at block 230), the program proceeds to block 232 where it determines if the alarm code is cleared. If the alarm code is not cleared (NO at block 232), the program proceeds to block 234 where it sets a short pre-trip flag not-true. By setting the short pre-trip flag not-true, operation of the short pre-trip is disabled and the unit 20 cannot run a short pre-trip. Flags and flag settings (true and not-true) are known to those skilled in the art and will not be discussed in greater detail herein. After block 234, the program returns to block START 1.

Referring back to block 232, if the alarm code is cleared (YES at block 232), the program proceeds to block 236 where it also sets the short pre-trip flag not-true. The program then proceeds to block 238 where it starts a timer. The timer may have any increment of time stored therein. In an embodiment of the present invention, the timer is a five minute timer. Referring back to block 230, if an alarm code is not active (NO at block 230), the program proceeds directly to block 238 to start the timer. After block 238, the program proceeds to block 240, another step in the program where it is determined whether an alarm code is active. If an alarm code is active (YES at block 240), the program proceeds to block 242 where it clears the timer. The program then proceeds to block 244 where it sets the short pre-trip flag not-true and then returns to block START 1 to start the process over.

Returning to block 240, if an alarm code is not active (NO at block 240), the program proceeds to block 246 where it determines if the unit 20 is in modulation as is understood by those skilled in the art. If the unit 20 is in modulation (YES at block 246), the program proceeds to block 248 where the timer is cleared. The program then proceeds to block 250 where it sets the short pre-trip flag true. By setting the short pre-trip flag true, operation of the short pre-trip is enabled and the unit 20 can run a short pre-trip. After block 250, the program proceeds to block 2 of FIG. 3B.

Referring back to block 246, if the unit 20 is not in modulation (NO at block 246), the program proceeds to block 252 where it determines if the temperature of the control sensor is within a predetermined range of the thermal setpoint. The control sensor may be any sensor within the unit 20 or coupled to the unit 20 that senses temperature. In an embodiment of the present invention, the control sensor is the discharge air temperature sensor 212 or the return air temperature sensor 200 of FIG. 2. The control sensor senses a corresponding temperature and the program determines if the temperature is within the predetermined range of the thermal setpoint. The predetermined range may be any temperature range around the thermal setpoint. In an embodiment of the present invention, the predetermined range is plus or minus 3° F. from the thermal setpoint, which can be set to any desired temperature. If the temperature of the control sensor is within the predetermined range of the thermal setpoint (YES at block 252), the program proceeds to block 248 and proceeds therefrom in a manner similar to that discussed above.

Referring back to block 252, if the temperature of the control sensor is not within the predetermined range of the thermal setpoint (NO at block 252), the program proceeds to block 254 where it determines if the unit 20 is in defrost. If the unit 20 is in defrost (YES at block 254), the program proceeds to block 256 where it clears the timer. The program then proceeds to block 4 of FIG. 3D. Referring back to block 254, if the unit 20 is not in defrost (NO at block 254), the program proceeds to block 258 where it determines if a door of the trailer 24 is open. If a door is open (YES at block 258), the program proceeds to block 256 and proceeds therefrom in a manner similar to that discussed above. Referring back to block 258, if a door is not open (NO at block 258), the program proceeds to block 260 where it determines if the timer is expired. If the timer is expired (YES at block 260), the program proceeds to block 3 of FIG. 3C. Referring back to block 260, if the timer is not expired (NO at block 260), the program proceeds to block 262 where the timer is updated. The program then proceeds to block 240 and proceeds therefrom in a manner similar to that discussed above.

Figure 3B:
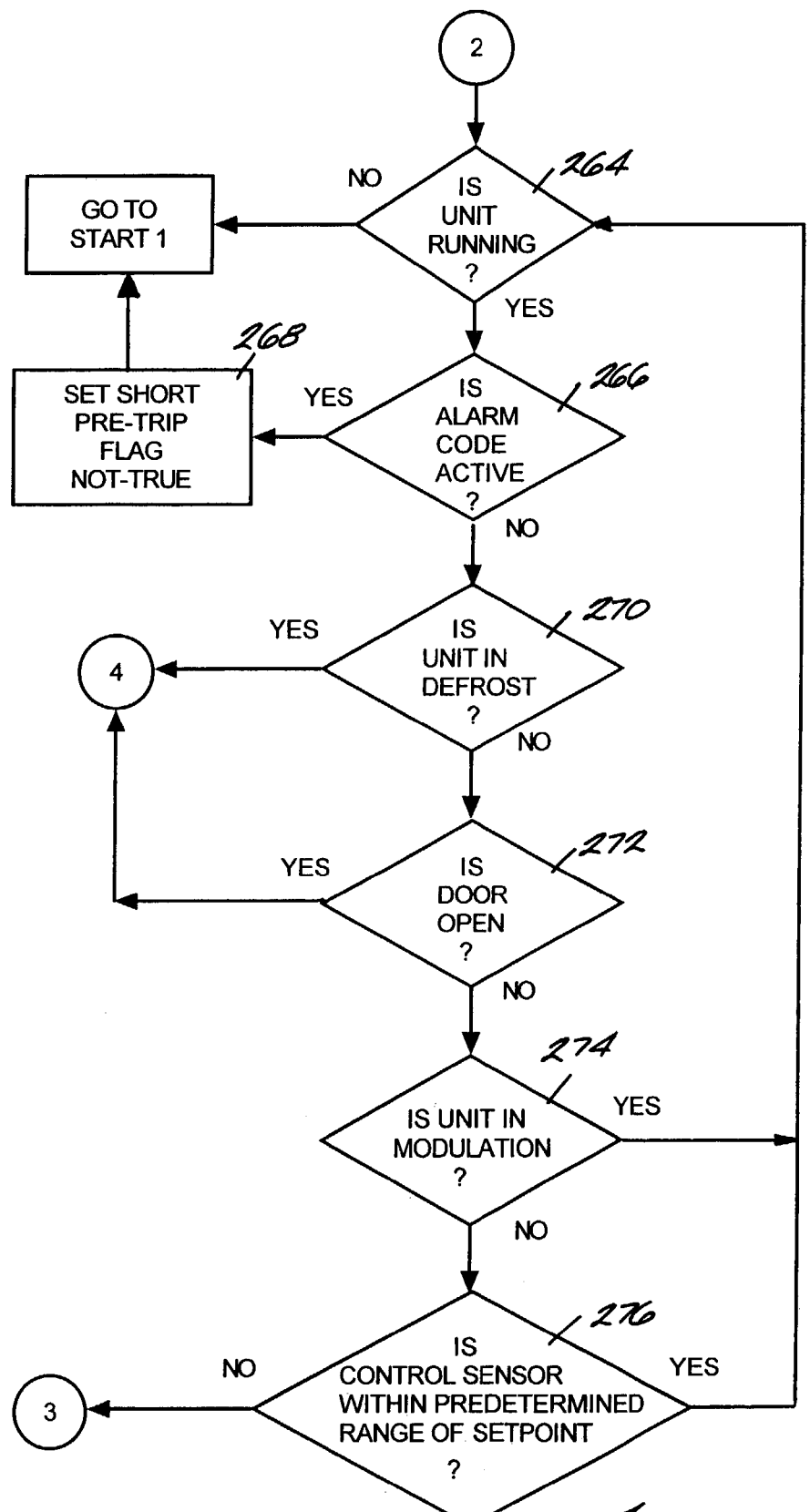

Referring to FIG. 3B and block 2, the program proceeds from block 2 to block 264 where it determines if the unit 20 is still running. If the unit 20 is not running (NO at block 264), the program returns to block START 1 of FIG. 3A. If the unit 20 is running (YES at block 264), the program proceeds to block 266 where it determines if an alarm code is active. If an alarm code is active (YES at block 266), the program proceeds to block 268 where it sets the short pre-trip flag not-true and then returns to block START 1 to start the process over.

Referring back to block 266, if an alarm code is not active (NO at block 266), the program proceeds to block 270 where the program determines if the unit 20 is in defrost. If the unit 20 is in defrost (YES at block 270), the program proceeds to block 4 of FIG. 3D. If the unit 20 is not in defrost (NO at block 270), the program proceeds to block 272 where it determines if a door of the trailer 24 is open. If a door is open (YES at block 272), the program proceeds to block 4 of FIG. 3D. If a door is not open (NO at block 272), the program proceeds to block 274 where it determines if the unit 20 is in modulation. If the unit 20 is in modulation (YES at block 274), the program returns to block 264 to again start the cycle just described. If the unit 20 is not in modulation (NO at block 274), the program proceeds to block 276 where it determines if the temperature of the control sensor is within a predetermined range of the thermal setpoint. The predetermined range may be any temperature range around the thermal setpoint. In an embodiment of the present invention, the predetermined range is plus or minus 3.5° F. from the thermal setpoint. If the temperature of the control sensor is not within the predetermined range of the thermal setpoint (NO at block 276), the program proceeds to block 3 of FIG. 3C. If the temperature of the control sensor is within the predetermined range of the thermal setpoint (YES at block 276), the program returns to block 264 to again start the cycle just described.

Figure 3C:
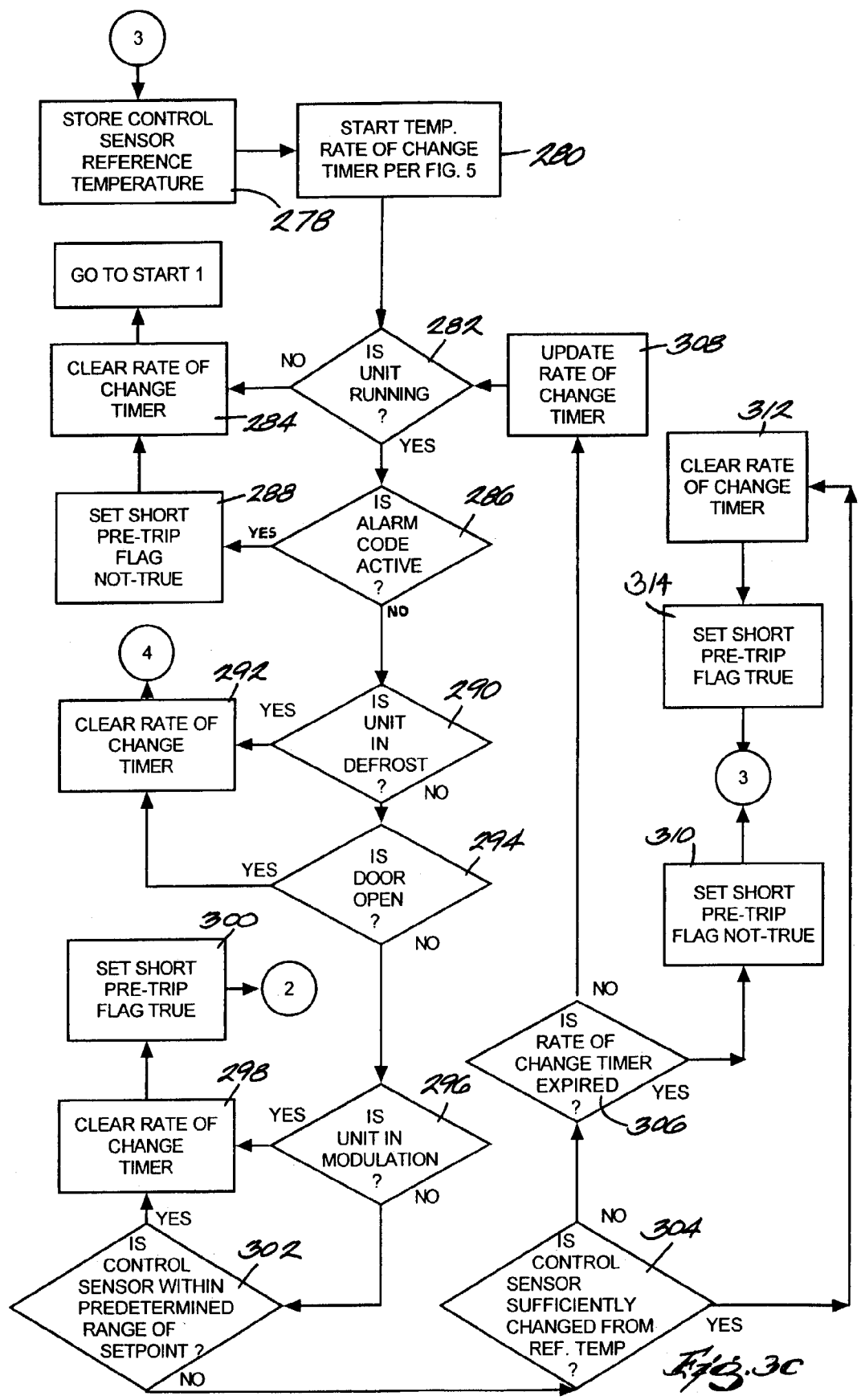

Referring to FIG. 3C and block 3, the program proceeds from block 3 to block 278 where it stores a reference temperature of the control sensor. As indicated above, the control sensor can be any temperature sensor within the unit 20 or coupled to the unit 20 that senses temperature. In an embodiment of the present invention, the control sensor is the sensor sensing the lower of the ambient temperature (ambient temperature sensor 225 of FIG. 2) or the return air temperature (return air temperature sensor 200 of FIG. 2). Therefore, the reference temperature, in this embodiment, is the lower of the ambient temperature and the return air temperature. The reference temperature is stored in the controller 224 or some other storage or memory device connected to the controller 224. After block 278, the program proceeds to block 280 where the program initiates a temperature rate of change timer. The time period of the rate of change timer is determined according to the stored reference temperature and the data in FIG. 5.

Figure 5:
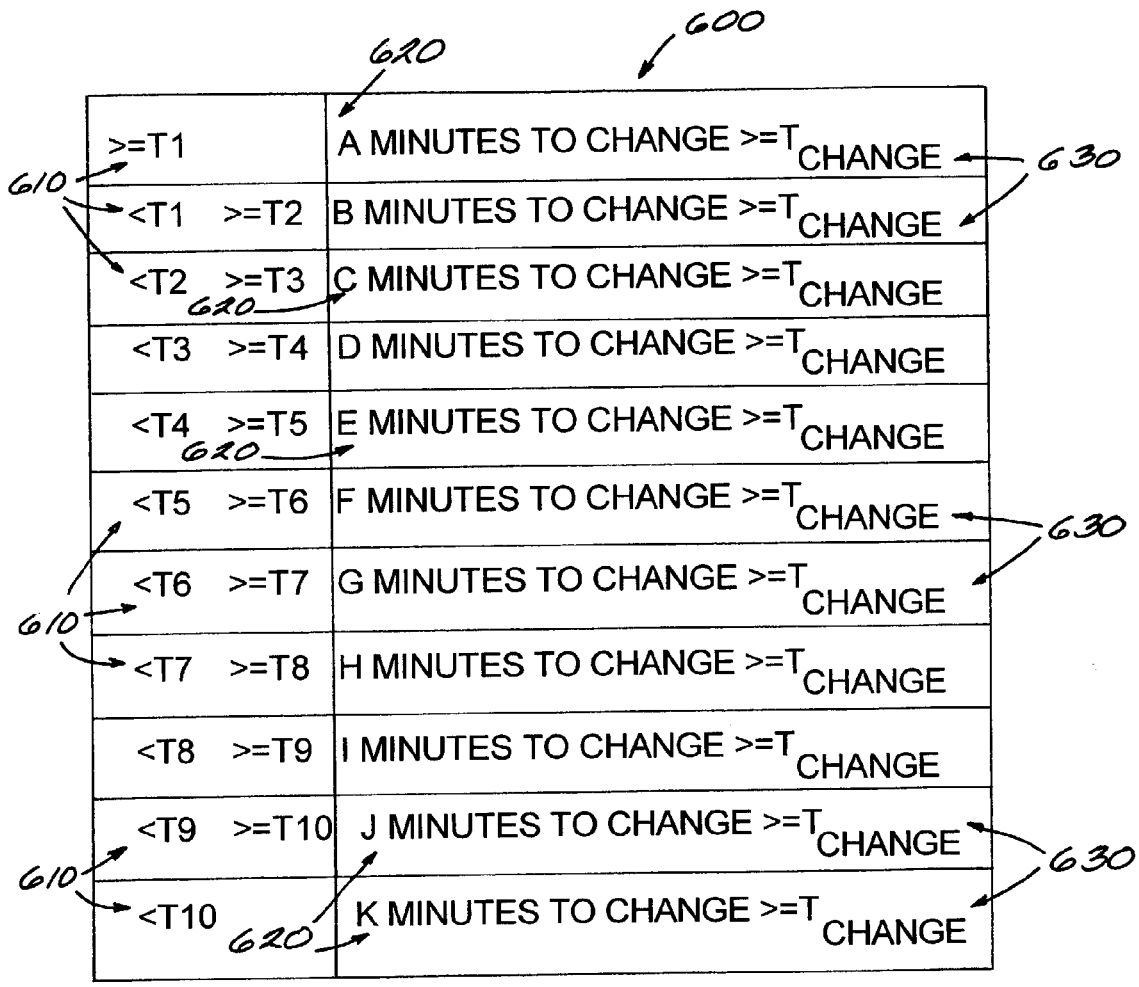
FIG. 5 is a rate of change chart useable with the flow chart shown in FIGS. 3A–3D.

With additional reference to FIG. 5, a rate of change chart 600 is illustrated and includes a plurality of reference temperature ranges 610 that are defined by temperatures T1–T10. FIG. 5 can include any number of reference temperature ranges (including only one). For example, FIG. 5 may only include five reference temperature ranges instead of eleven. Accordingly, only temperatures T1, T2, T3, and T4 would be necessary. The temperatures T1–T10 in the illustrated embodiment of the chart in FIG. 5 can have any temperature values. The rate of change chart 600 also includes a time element 620 corresponding to each reference temperature range 610. Therefore, the number of time elements 620 is equal to the number of reference temperature ranges 610. The time elements 620 are indicated by letters A–K and can have any time value. The rate of change chart 600 further includes a temperature change value 630 corresponding to each reference temperature range 610 and time element 620. The temperature change value 630 is indicated by $T_{change}$ and can have any temperature value. Although each row of reference temperature ranges 610 and time elements 620 have a corresponding $T_{change}$, the temperature values of $T_{change}$ do not necessarily have to be the same for each row. Accordingly, each $T_{change}$ can have a different value or as many of the $T_{change}$ values as desired can be identical. Use of the rate of change chart 600 with the flowchart illustrated in FIGS. 3A–3D will be better understood after further description of the flowchart and with the example to follow the description of the flowchart.

Referring back to FIG. 3C, after block 280, the program proceeds to block 282 where it again determines if the unit 20 is running. If the unit 20 is not running (NO at block 282), the program proceeds to block 284 where it clears the rate of change timer. The program then returns to block START 1 of FIG. 3A. Referring back to block 282, if the unit 20 is running (YES at block 282), the program proceeds to block 286 where it determines if an alarm code is active. If an alarm code is active (YES at block 286), the program proceeds to block 288 where it sets the short pre-trip flag not-true. The program then proceeds to block 284 and proceeds therefrom in a manner similar to that discussed above. Referring back to block 286, if an alarm code is not active (NO at block 286), the program proceeds to block 290 where it determines if the unit 20 is in defrost. If the unit 20 is in defrost (YES at block 290), the program proceeds to block 292 where the program clears the rate of change timer. The program then proceeds to block 4 of FIG. 3D. Referring back to block 290, if the unit 20 is not in defrost (NO at block 290), the program proceeds to block 294 where it determines if a door of the trailer 24 is open. If a door is open (YES at block 294), the program proceeds to block 292 and proceeds therefrom in a manner similar to that discussed above.

Referring back to block 294, if a door is not open on the trailer 24 (NO at block 294), the program proceeds to block 296 where it determines if the unit 20 is in modulation. If the unit 20 is in modulation (YES at block 296), the program proceeds to block 298 where it clears the rate of change timer. The program then proceeds to block 300 where it sets the short pre-trip flag true and then proceeds to block 2 of FIG. 3B. Referring back to block 296, if the unit 20 is not in modulation (NO at block 296), the program proceeds to block 302 where it determines if the temperature of the control sensor is within a predetermined range of the thermal setpoint. The predetermined range may be any temperature range around the thermal setpoint. In an embodiment of the present invention, the predetermined range is plus or minus 3° F. from the thermal setpoint. If the temperature of the control sensor is within the predetermined range of the thermal setpoint (YES at block 302), the program proceeds to block 298 and proceeds therefrom in a manner similar to that discussed above. If the temperature of the control sensor is not within the predetermined range of the thermal setpoint (NO at block 302), the program proceeds to block 304 where it determines if the temperature of the control sensor has changed a sufficient amount from the reference temperature. The amount of change that is sufficient can be established by the rate of change chart illustrated in FIG. 5 and, more specifically, by the $T_{change}$ in the chart. For example, if the appropriate $T_{change}$ is 1° F., then the reference temperature would have to change plus or minus 1° F. for the change to be sufficient.

If the temperature of the control sensor has not sufficiently changed from the reference temperature (NO at block 304), the program proceeds to block 306 where it determines if the rate of change timer is expired. If the rate of change timer is not expired (NO at block 306), the program proceeds to block 308 and updates the rate of change timer. The program then returns to block 282 and proceeds as discussed above. Referring back to block 306, if the rate of change timer is expired (YES at block 306), the program proceeds to block 310 where it sets the short pre-trip flag not-true. The program then returns to block 3 and starts the cycle of FIG. 3C over. Referring back to block 304, if the temperature of the control sensor has sufficiently changed form the reference temperature (YES at block 304), the program proceeds to block 312 where it clears the rate of change timer. The program then proceeds to block 314 where it sets the short pre-trip flag true. After block 314, the program returns to block 3 and starts the cycle of FIG. 3C over.

Figure 3D:
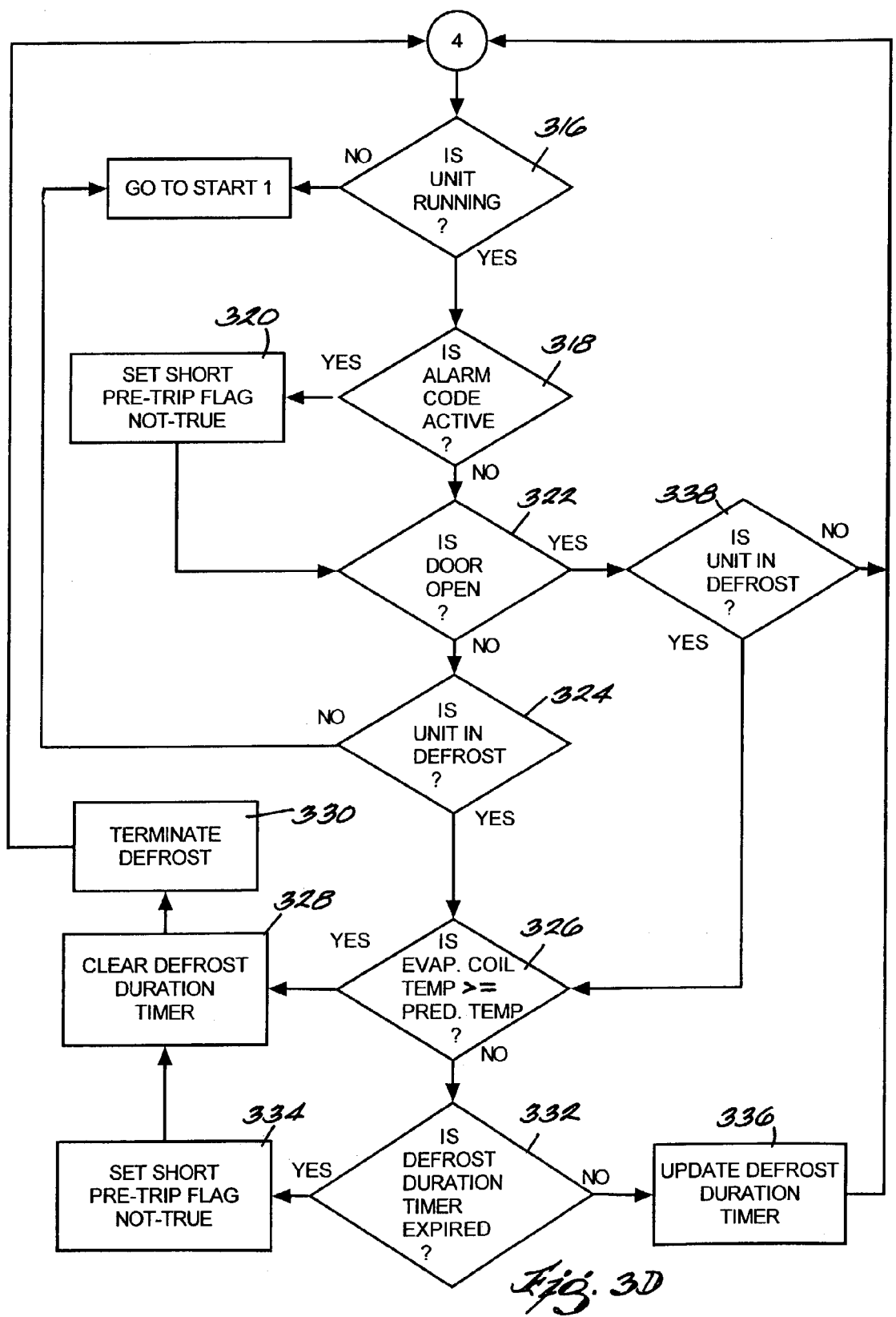

Referring to FIG. 3D and block 4, the program proceeds to block 316 where it again determines if the unit 20 is running. If the unit 20 is not running (NO at block 316), the program returns to block START 1. If the unit 20 is running (YES at block 316), the program proceeds to block 318 where it determines if an alarm code is active. If an alarm code is active (YES at block 318), the program proceeds to block 320 where it sets the short pre-trip flag not-true. The program then proceeds to block 322 where the program determines if a door of the trailer 24 is open. Referring back to block 318, if an alarm code is not active (NO at block 318), the program proceeds directly to block 322. If a door is not open (NO at block 322), the program proceeds to block 324 where it determines if the unit 20 is in defrost. If the unit 20 is not in defrost (NO at block 324), the program returns to block START 1. If the unit 20 is in defrost (YES at block 324), the program proceeds to block 326 and determines if the temperature of the evaporator coil 116 is greater than or equal to a predetermined temperature. The predetermined temperature can be any temperature value. In an embodiment of the present invention, the predetermined temperature is 58° F. If the temperature of the evaporator coil is greater than or equal to the predetermined temperature (YES at block 326), the program proceeds to block 328 where it clears the defrost duration timer. The defrost duration timer monitors, determines, and/or counts a period of time between the initiation and the termination of a defrost cycle, and can have any period of time. The period of time can be referred to as a duration time. After block 328, the program proceeds to block 330 where defrost is terminated. The program then returns to block 4.

Referring back to block 326, if the temperature of the evaporator coil is not greater than or equal to the predetermined temperature (NO at block 326), the program proceeds to block 332 where it determines if the defrost duration timer is expired. If the defrost duration timer is expired (YES at block 332), the program proceeds to block 334 where it sets the short pre-trip flag not-true. The program then proceeds to block 328 and proceeds therefrom in a manner similar to that discussed above. Referring back to block 332, if the defrost duration timer is not expired (NO at block 332), the program proceeds to block 336 where it updates the defrost duration timer. The program then returns to block 4.

Referring back to block 322, if a door is open (YES at block 322), the program proceeds to block 338 where it determines if the unit 20 is in defrost. If the unit 20 is not in defrost (NO at block 338), the program returns to block 4. If the unit 20 is in defrost (YES at block 338), the program proceeds to block 326 and proceeds therefrom in a manner similar to that discussed above.

Now that the flow chart illustrated in FIGS. 3A–3D has been described in detail, an example will be described with respect to the flowchart and the rate of change chart 600 illustrated in FIG. 5. As mentioned above, the program stores a reference temperature of the control sensor at block 278 of FIG. 3C, and the control sensor can be either the ambient temperature sensor 225 or the return air temperature sensor 200. The control sensor is the sensor that has the lower temperature. Assume, for example, that the ambient air temperature is 72° F. and the return air temperature is 57° F. Since the return air temperature is lower, the return air temperature sensor is the control sensor and the return air temperature of 57° F. is stored as the reference temperature.

Assume, for example, that T1=90° F., T2=80° F., T3=70° F., T4=60° F., T5=50 F., T6=40° F., T7=30° F., T8=20° F., T9=10° F., and T10=0° F., and that A=2.0, B=2.5, C=3.0, D=3.5, E=4.0, F=4.5, G=5.0, H=5.5, I=6.0, J=6.5, and K=7.0. Further assume, for example, that all $T_{change}$=1.0° F. Since the reference temperature (return air temperature for this example) is 57° F., the reference temperature falls into the fifth reference temperature range down from the top of the chart 600 of FIG. 5, i.e., between 60° F. (T4) and 50° F. (T5). The range in which the reference temperature falls determines the amount of time (in minutes) the unit 20 has to change the reference temperature by $T_{change}$. In this example, the rate of change timer will be programmed with 4.0 minutes and the unit 20 will have 4.0 minutes to change the reference temperature of 57° F. by 1° F. ($T_{change}$) to either 56° F. if the unit 20 is cooling or 58° F. if the unit 20 is heating. At block 304 of FIG. 3C, the program determines if the reference temperature has changed 1° F. If the reference temperature has not changed the 1° F., the program proceeds to block 306 and the program determines if the rate of change timer is expired or has reached the 4.0 minute maximum established by the rate of change chart in FIG. 5. If the timer has not reached 4.0 minutes, then the timer is updated and the loop continues. However, if the timer does expire before the reference timer has changed 1° F., the program proceeds to block 310 and sets the short pre-trip flag not-true, which disables the short pre-trip from running. Referring back to block 304, if on the other hand the reference temperature does change 1° F. prior to the expiration of the 4.0 minute timer, the timer is cleared at block 312 and the program proceeds to block 314 where it sets the short pre-trip flag true, which enables the short pre-trip to run.

The flowchart illustrated in FIGS. 3A–3D determines if the unit 20 can or cannot run a short pre-trip operation by setting the short pre-trip flags true or not-true, respectively. Only after the short pre-trip flag has been set true can a short pre-trip operation be run. Operation of the short pre-trip will be described hereinafter with respect to the flowchart illustrated in FIGS. 4A–4E.

Figure 4A:
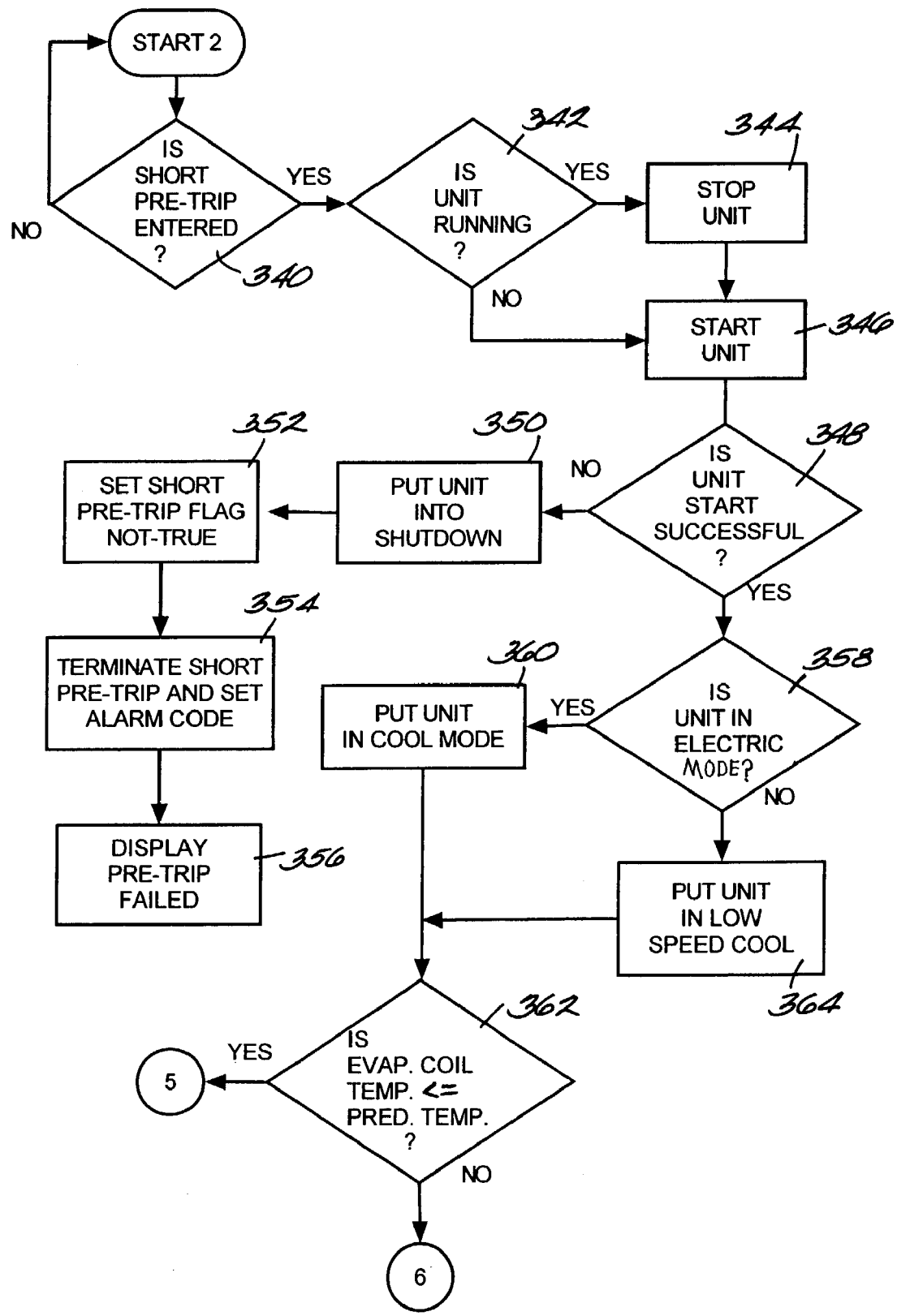
FIGS. 4A–4E show a flow chart illustrating a second portion of an embodiment of a diagnostic method for a temperature control unit in the form of a computer program according to the present invention.

Referring to FIGS. 4A–4E, the second portion of an embodiment of the present inventive method will be described. Referring to FIG. 4A, the program begins at block START 2. The program then proceeds to block 340 where it determines if a short pre-trip is entered into the unit 20. In order for the unit 20 to run a short pre-trip, a user must establish that a short pre-trip is desired. This can be done by a user via a display or interface (not shown) on the unit 20 or electrically connected to the unit 20. The user has the option to enter short pre-trip or regular pre-trip into the unit 20 by selecting a short pre-trip button or a regular pre-trip button, respectively. Regular pre-trips are known to those skilled in the art. If a short pre-trip is not entered (NO at block 340), the program returns to block START 2. If a short pre-trip is entered (YES at block 340), the program proceeds to block 342 where it determines if the unit 20 is running. If the unit 20 is running (YES at block 342), the program proceeds to block 344 where the unit 20 is stopped. The program then proceeds to block 346 where it starts the unit 20. Referring back to block 342, if the unit 20 is not running (NO at block 342), the program proceeds to block 346 where it starts the unit 20. Reasons for stopping and starting the unit 20 are known to those of ordinary skill in the art.

After block 346, the program proceeds to block 348, where the program determines if the unit start was successful. Starting the unit 20 can be unsuccessful for a number of reasons known to those skilled in the art. If the unit start is not successful (NO at block 348), the program proceeds to block 350 where it shuts down the unit 20. The program then proceeds to block 352 where the program sets the short pre-trip flag not-true. After block 352, the program proceeds to block 354 where the program terminates short pre-trip and sets an alarm code. The program then proceeds to block 356 where it displays pre-trip failed on the user display or interface. This provides a warning to the user that the unit 20 has malfunctioned and that temperature sensitive product may be lost if the product is loaded into the conditioned space 28.

Referring back to block 348, if the unit start is successful (YES at block 348), the program proceeds to block 358 where the program determines if the unit 20 is in electric mode. As described above, the unit 20 includes an internal combustion engine 48 and an optional stand-by electric motor 52 to power the compressor 40. The unit 20 is in the electric mode when the electric motor 52 is powering the compressor 40. If the unit 20 is in the electric mode (YES at block 358), the program proceeds to block 360 where the program puts the unit 20 into cool mode. The program then proceeds to block 362 where it determines if the temperature of the evaporator coil is less than or equal to a predetermined temperature. The predetermined temperature can be any temperature value. In an embodiment of the present invention, the predetermined temperature is 45° F. Referring back to block 358, if the unit 20 is not in electric mode (NO at block 358), the program proceeds to block 364 where the unit 20 is put into low speed cool. When the unit 20 is not in the electric mode, the internal combustion engine 48 is powering the compressor 40. The program then proceeds to block 362. If the temperature of the evaporator coil is less than or equal to the predetermined temperature (YES at block 362), the program proceeds to block 5 of FIG. 4B. If the evaporator coil is not less than or equal to the predetermined temperature (NO at block 362), the program proceeds to block 6 of 4C.

Figure 4B:
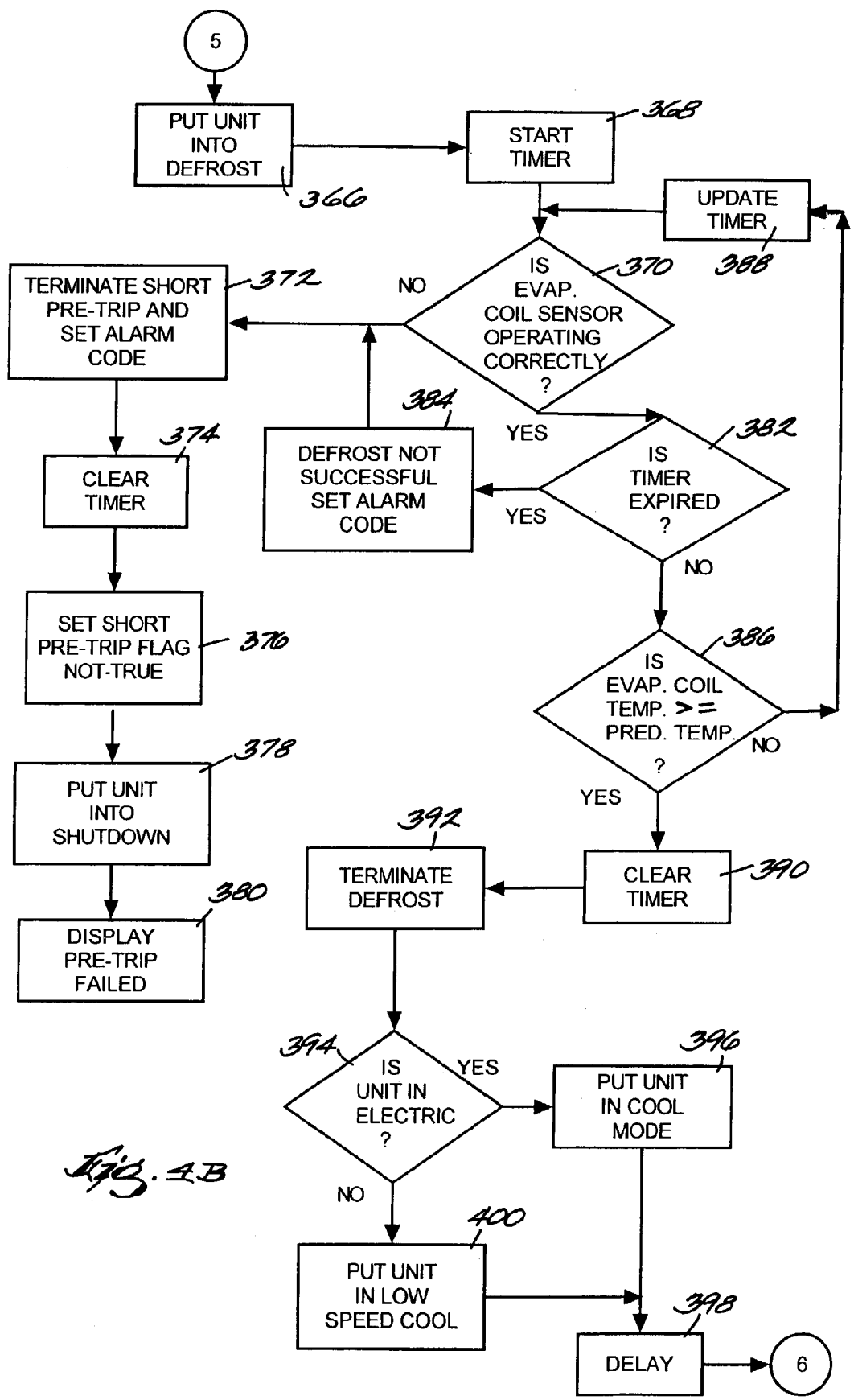

Referring to FIG. 4B and block 5, the program proceeds from block 5 to block 366 where it puts the unit 20 into defrost. The program then proceeds to block 368 where it starts a timer. The timer can be a duration timer and can have any increment of time stored therein. In an embodiment of the present invention, the timer is a twenty minute duration timer. After block 368, the program proceeds to block 370 where it determines if the evaporator coil temperature sensor is operating correctly. If the evaporator coil temperature sensor is not operating correctly (NO at block 370), the program proceeds to block 372 where it terminates short pre-trip and sets an alarm code. The program then proceeds to block 374 where the timer is cleared. After block 374, the program proceeds to block 376 where it sets the short pre-trip flag not-true. The program then proceeds to block 378 where it shuts down the unit 20. After block 378, the program proceeds to block 380 where it displays pre-trip failed on the user display or interface.

Referring back to block 370, if the evaporator coil sensor is operating correctly (YES at block 370), the program proceeds to block 382 where it determines if the timer is expired. If the timer is expired (YES at block 382), the program proceeds to block 384 where it sets an alarm code because the defrost was not successful. The program then proceeds to block 372 and proceeds therefrom in a manner similar to that discussed above. Referring back to block 382, if the timer is not expired (NO at block 382), the program proceeds to block 386 where it determines if the temperature of the evaporator coil is greater than or equal to a predetermined temperature. The predetermined temperature can be any temperature value. In an embodiment of the present invention, the predetermined temperature is 58° F. If the temperature of the evaporator coil is not greater than or equal to the predetermined temperature (NO at block 386), the program proceeds to block 388 where the timer is updated. The program then returns to block 370 and proceeds therefrom in a manner similar to that discussed above.

Referring back to block 386, if the temperature of the evaporator coil is greater than or equal to the predetermined temperature (YES at block 386), the program proceeds to block 390 where it clears the timer. The program then proceeds to block 392 where it terminates defrost. After block 392, the program proceeds to block 394 where it determines if the unit 20 is in electric mode. If the unit 20 is in electric mode (YES at block 394), the program proceeds to block 396 where it puts the unit 20 in cool mode. The program then proceeds to block 398 where the program initiates a delay. The delay can be any period of time. In an embodiment of the present invention, the delay is twenty seconds. After block 398, the program proceeds to block 6 of 4C. Referring back to block 394, if the unit 20 is not in electric mode (NO at block 394), the program proceeds to block 400 where it puts the unit 20 into low speed cool. The program then proceeds to block 398 and proceeds therefrom in a manner similar to that discussed above.

Figure 4C:
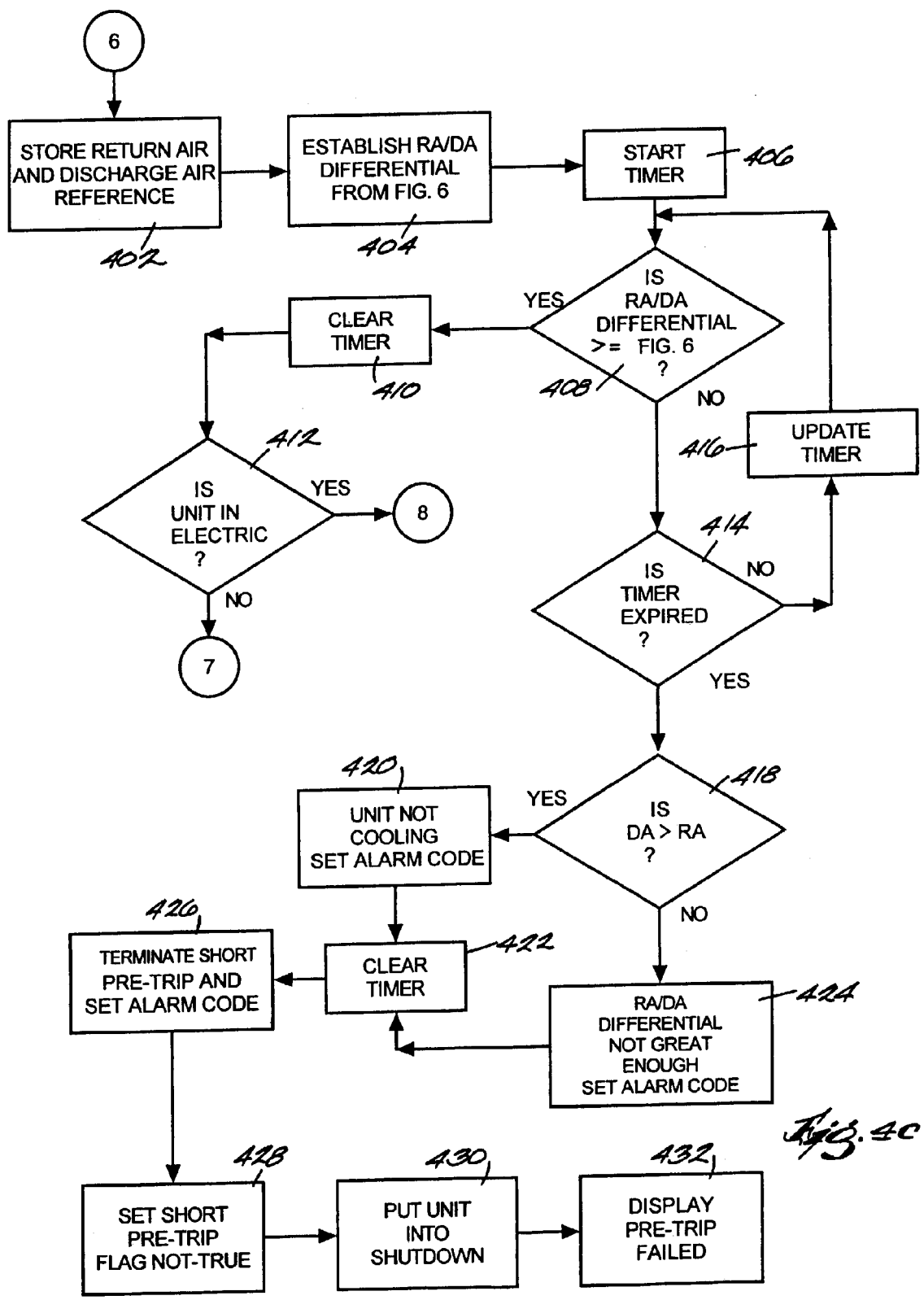

Referring to FIG. 4C and block 6, the program proceeds from block 6 to block 402 where the program stores a return air reference temperature and a discharge reference temperature. The reference temperatures are temperatures sensed by the return air temperature sensor 200 and the discharge air temperature sensor 212. The return air and discharge air reference temperatures are stored in the controller 224 or some other storage or memory device connected to the controller 224. Although the program stores the return air and discharge air reference temperatures, the program can store temperatures of any temperature sensor in the unit 20 or connected to the unit 20 and use them in a similar fashion to the return air and discharge air reference temperatures.

Figure 6:
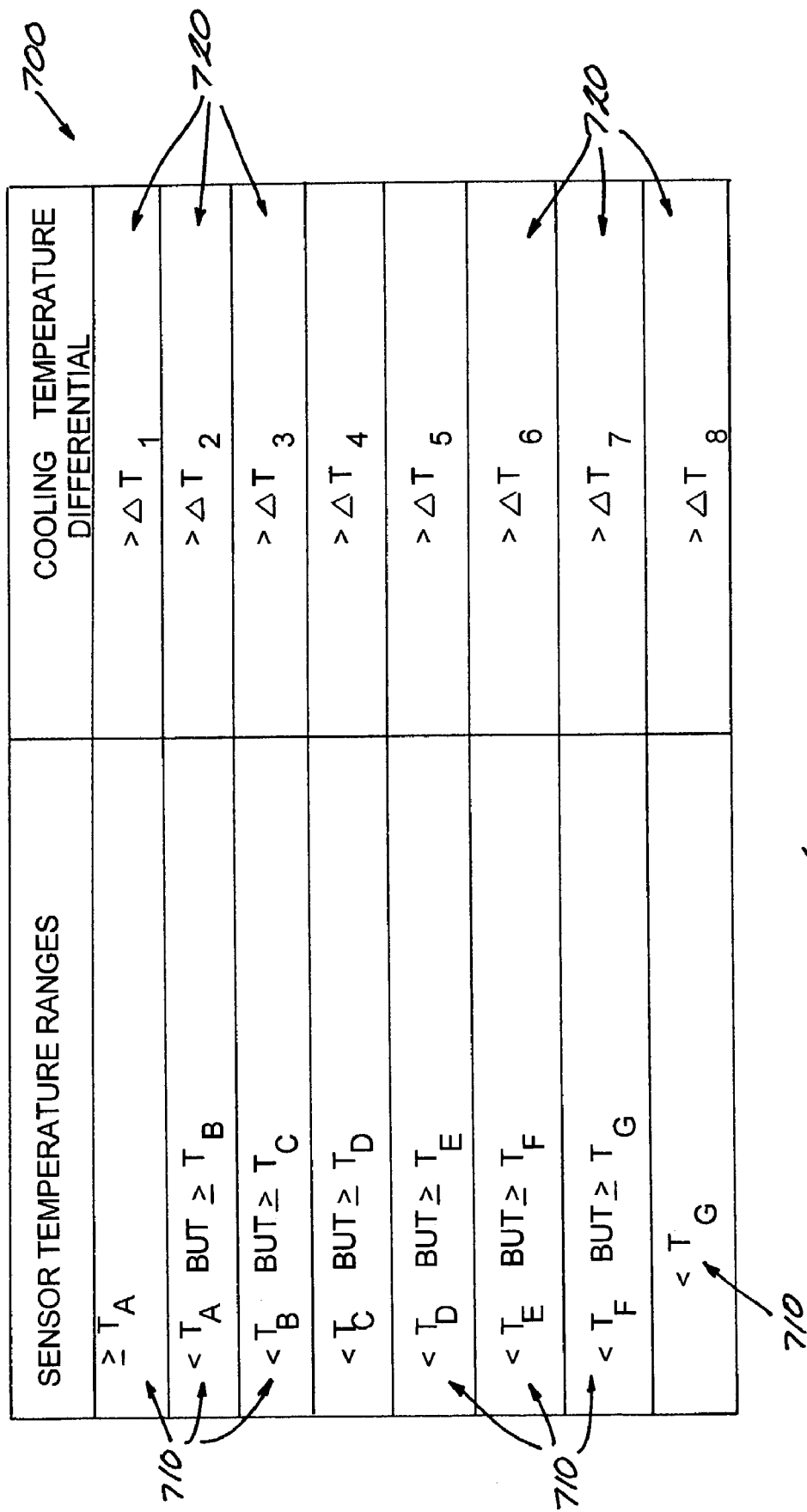
FIG. 6 is a cooling check chart useable with the flow chart shown in FIGS. 4A–4E.

After block 402, the program proceeds to block 404 where it establishes the return air/discharge air temperature differential from a cooling check chart 700 illustrated in FIG. 6. The return air/discharge air temperature differential is the temperature difference between the return air temperature and the discharge air temperature necessary for the short pre-trip to pass a short pre-trip cooling check.

With additional reference to FIG. 6, the cooling check chart 700 includes a plurality of sensor temperature ranges 710 that are defined by temperatures $T_A$, $T_B$, $T_C$, $T_D$, $T_E$, $T_F$, and $T_G$. The cooling check chart 700 can include any number of sensor temperature ranges (including only one) and, therefore, can include any number of temperatures to define the sensor temperature ranges. For example, the cooling check chart 700 may only include four sensor temperature ranges instead of eight. Accordingly, only temperatures $T_A$, $T_B$, and $T_C$ would be necessary. The temperatures $T_A$–$T_G$ in the illustrated embodiment of the chart in FIG. 6 can have any temperature values. The cooling check chart 700 also includes a plurality of cooling temperature differentials 720, each corresponding to one of the sensor temperature ranges 710. The cooling temperature differentials 720 are indicated by $\Delta T_1$, $\Delta T_2$, $\Delta T_3$, $\Delta T_4$, $\Delta T_5$, $\Delta T_6$, $\Delta T_7$, and $\Delta T_8$. Each cooling temperature differential 720 can have any temperature value and can have a unique temperature value as compared to the other cooling temperature differentials or can have a similar temperature value to any number of the other cooling temperature differentials. The cooling temperature differentials 720 determine the temperature difference necessary between the return air and the discharge air for the unit 20 to pass the short pre-trip cooling check. Use of the cooling check chart 700 with the flowchart illustrated in FIGS. 4A–4E will be better understood after further description of the flowchart and with the example that follows the description of the flowchart.

Referring back to FIG. 4C, after block 404, the program proceeds to block 406 where it starts a timer. The timer may have any increment of time stored therein. In an embodiment of the present invention, the timer is a fifteen minute timer. After block 406, the program proceeds to block 408 where it determines if the temperature differential between the return air temperature and the discharge air temperature is greater than the appropriate cooling temperature differential as determined in FIG. 6. To establish the appropriate cooling temperature differential, the ambient temperature, return air temperature, and the discharge air temperature are all sensed by their appropriate sensors. The appropriate cooling temperature differential corresponds to the sensor temperature range in which the lowest of the three temperatures fall. If, for example, the lowest of the ambient, return air, and discharge air temperatures falls between $T_C$ and $T_D$, then the appropriate cooling temperature differential will be $\Delta T_4$.

If the temperature differential between the return air temperature and the discharge air temperature is greater than the appropriate cooling temperature differential (YES at block 408), the cooling check passes and the program proceeds to block 410 where it clears the timer. The program then proceeds to block 412 where the program determines if the unit 20 is in the electric mode. If the unit 20 is not in the electric mode (NO at block 412), the program proceeds to block 7 of FIG. 4D. If the unit 20 is in the electric mode (YES at block 412), the program proceeds to block 8 of FIG. 4E.

Referring back to block 408, if the temperature differential between the return air temperature and the discharge air temperature is not greater than the appropriate cooling temperature differential (NO at block 408), the program proceeds to block 414 where it determines if the timer is expired. If the timer is not expired (NO at block 414), the program proceeds to block 416 where it updates the timer. The program then returns to block 408 and proceeds therefrom in a manner similar to that discussed above. Referring back to block 414, if the timer is expired (YES at block 414), the program proceeds to block 418 where the program determines if the discharge air temperature is greater than the return air temperature. If the discharge air temperature is greater than the return air temperature (YES at block 418), the program proceeds to block 420 where the program sets an alarm code because the unit 20 is not cooling. The program then proceeds to block 422 and clears the timer. Referring back to block 418, if the discharge air temperature is not greater than the return air temperature (NO at block 418), the program proceeds to block 424 where the program sets an alarm code because the unit 20 did not create a temperature differential between the return air and discharge air greater than the appropriate cooling temperature differential of FIG. 6 within the appropriate time limit of the timer. The program then proceeds to block 422.

After block 422, the program proceeds to block 426 where it terminates short pre-trip and sets an alarm code. The program then proceeds to block 428 where it sets the short pre-trip flag not-true. After block 428, the program proceeds to block 430 where it shuts down the unit 20. The program then proceeds to block 432 where it displays pre-trip failed on the user display or interface.

Figure 4D:
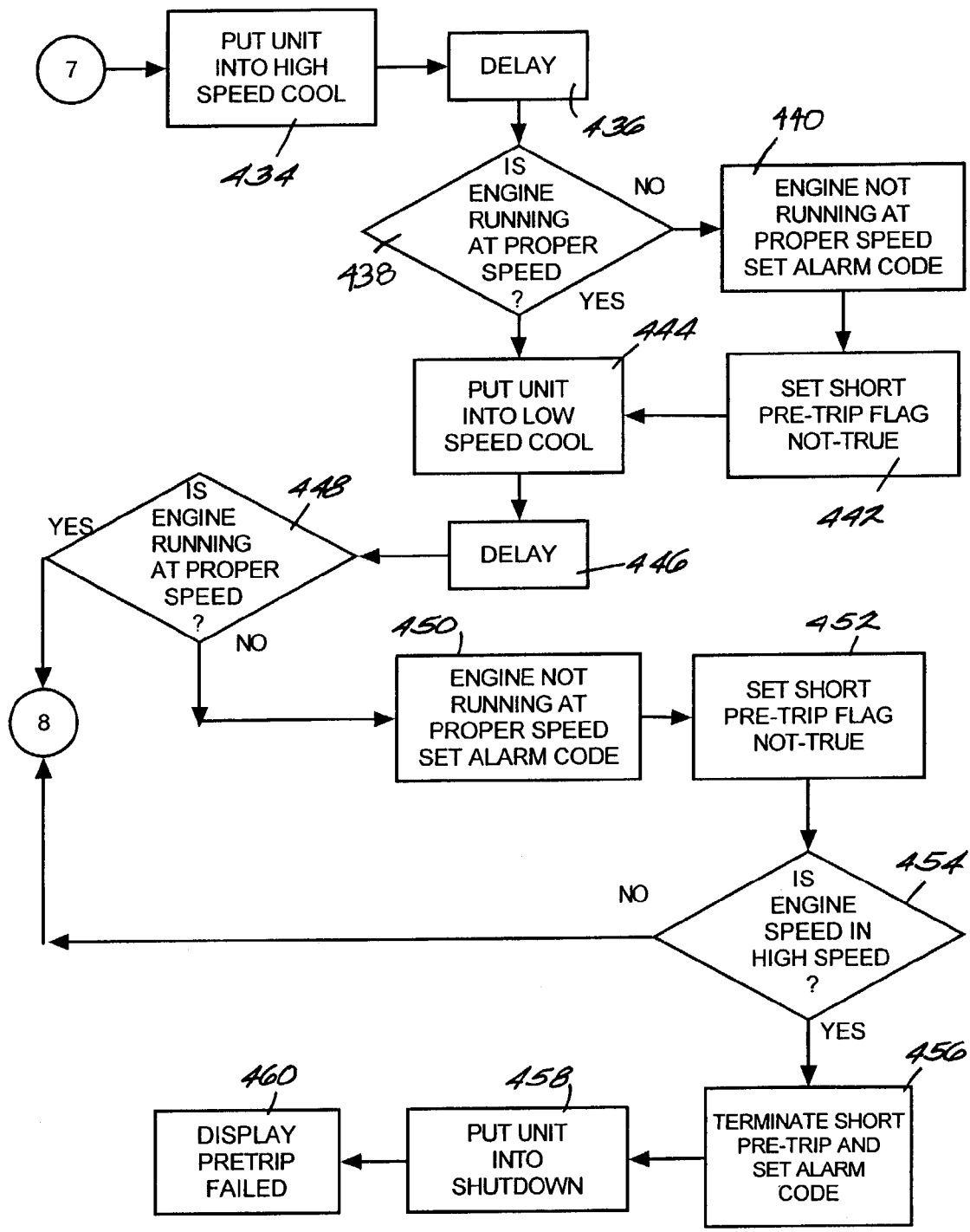

Referring to FIG. 4D and block 7, the program proceeds from block 7 to block 434 where the program puts the unit 20 into high speed cool. The program then proceeds to block 436 where it initiates a delay. The delay can be any period of time. In an embodiment of the present invention, the delay is thirty seconds. After block 436, the program proceeds to block 438 and determines if the engine 48 (FIG. 2) is running at a proper speed for high speed cool. As described above, the unit 20 includes an internal combustion engine 48 and an optional stand-by electric motor 52 to power the compressor 40. During this portion of the flowchart, it has been determined that the compressor 40 is being powered by the engine 48 and that the speed of the engine 48 is being monitored for malfunctions during high speed cool. If the engine 48 is not running at a proper speed for high speed cool (NO at block 438), the program proceeds to block 440 where it sets an alarm code because the engine is not running at a proper speed for high speed cool. The program then proceeds to block 442 where it sets the short pre-trip flag not-true. After block 442, the program proceeds to block 444 where it puts the unit 20 into low speed cool. Referring back to block 438, if the engine is running at a proper speed for high speed cool (YES at block 438), the program proceeds to block 444.

After block 444, the program proceeds to block 446 where it initiates a delay. The delay can be any period of time. In an embodiment of the present invention, the delay is thirty seconds. The program then proceeds to block 448 where the program determines if the engine 48 is running at a proper speed for low speed cool. If the engine 48 is running at a proper speed for low speed cool (YES at block 448), the program proceeds to block 8 of FIG. 4E. If the engine 48 is not running at a proper speed for low speed cool (NO at block 448), the program proceeds to block 450 where it sets an alarm code because the engine 48 is not running at a proper speed for low speed cool. The program then proceeds to block 452 where the program sets the short pre-trip flag not-true. After block 452, the program proceeds to block 454 where it determines if the engine speed is high speed. If the engine speed is not high speed (NO at block 454), the program proceeds to block 8 of FIG. 4E. If the engine speed is high speed (YES at block 454), the program proceeds to block 456 where the program terminates short pre-trip and sets an alarm code. The program then proceeds to block 458 where it shuts down the unit 20. After block 458, the program proceeds to block 460 where it displays pre-trip failed on the user display or interface.

Figure 4E:
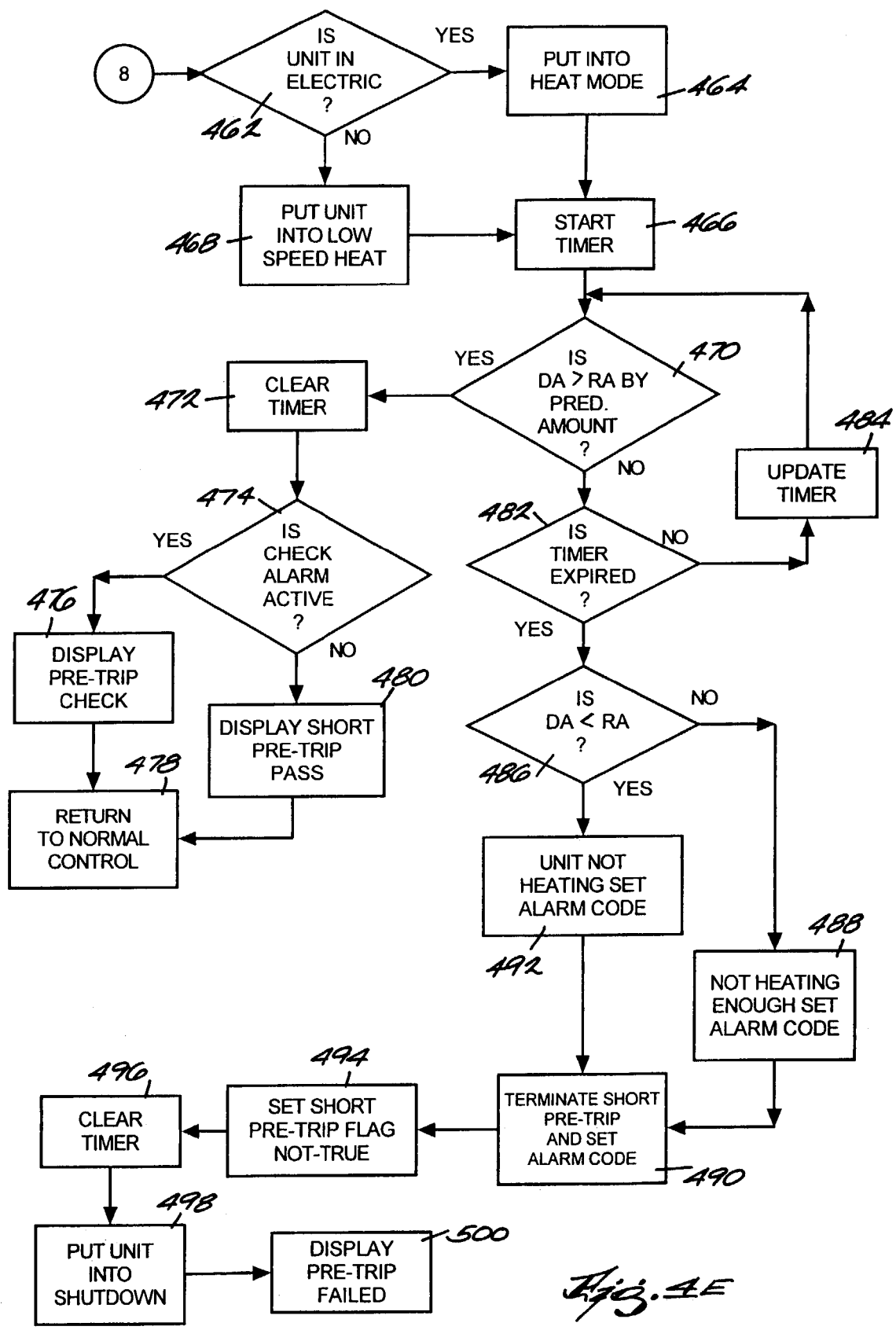

Referring to FIG. 4E and block 8, the program proceeds from block 8 to block 462 where the program determines if the unit 20 is in the electric mode. If the unit 20 is in the electric mode (YES at block 462), the program proceeds to block 464 where it puts the unit 20 into heat mode. The program then proceeds to block 466 where it starts a timer. The timer may have any increment of time stored therein. In an embodiment of the present invention, the timer is a five minute timer. Referring back to block 462, if the unit 20 is not in the electric mode (NO at block 462), the program proceeds to block 468 where it puts the unit 20 into low speed heat. The program then proceeds to block 466.

After block 466, the program proceeds to block 470 where the program determines if the discharge air temperature is greater than the return air temperature by a predetermined amount. Generally at block 470, the program is performing the heating test on the unit 20 to determine if the unit 20 can sufficiently heat the conditioned space 28 of the trailer 24.

The predetermined amount can be any temperature value. In an embodiment of the present invention, the predetermined amount is 2° F. If the discharge air is greater than the return air by the predetermined amount (YES at block 470), the heating check passes and the program proceeds to block 472 where it clears the timer. The program then proceeds to block 474 where the program determines if a check alarm is active.

A check alarm is a minor alarm that occurs or is activated due to a minor malfunction in the unit 20. Even if a check alarm is active, the unit 20 can still run. Alarm codes on the other hand, are serious malfunctions and unit 20 should be shutdown. Types of check alarms are known to those skilled in the art and will not be discussed in greater detail herein. If a check alarm is active (YES at block 474), the program proceeds to block 476 where it displays short pre-trip check on the user display or interface. When short pre-trip check is displayed on the user display or interface, a user or operator knows that a check alarm is active and that a minor malfunction has occurred in the unit 20. The user or operator has the option to check for the malfunction or allow the unit 20 to continue running. The program then proceeds to block 478 where the program returns the unit 20 to normal control. Referring back to block 474, if a check alarm is not active (NO at block 474), the program proceeds to block 480 where it displays short pre-trip pass. When short pre-trip pass is displayed on the user display or interface, the cooling and heating checks have passed and a user or operator knows that the unit 20 has no malfunctions. The program then proceeds to block 478 and returns the unit 20 to normal control.

Referring back to block 470, if the discharge air temperature is not greater than the return air temperature (NO at block 470), the program proceeds to block 482 where it determines if the timer is expired. If the timer is not expired (NO at block 482), the program proceeds to block 484 where it updates the timer. The program then returns to block 470 and proceeds therefrom in a manner similar to that discussed above.

Referring back to block 482, if the timer is expired (YES at block 482), the program proceeds to block 486 where it determines if the discharge air temperature is less than the return air temperature. If the discharge air temperature is not less than the return air temperature (NO at block 486), the program proceeds to block 488 where the program sets an alarm code because the unit 20 did not sufficiently heat the discharge air temperature to the predetermined amount above the return air (block 470) within the time limit of the timer. The program then proceeds to block 490 where it terminates short pre-trip and sets an alarm code. Referring back to block 486, if the discharge air temperature is less than the return air temperature (YES at block 486), the program proceeds to block 492 where it sets an alarm code because the unit 20 is not heating when the unit 20 is supposed to be heating. The program then proceeds to block 490.

After block 490, the program proceeds to block 494 where the short pre-trip flag is set not-true. The program then proceeds to block 496 where it clears the timer. After block 496, the program proceeds to block 498 where it shuts down the unit 20. The program then proceeds to block 500 where the program displays pre-trip failed on the user display or interface.

Now that the flow chart illustrated in FIGS. 4A–4E has been described in detail, an example will be described with respect to the flowchart and the cooling check chart 700 illustrated in FIG. 6. As mentioned above, the program stores a return air reference temperature and a discharge air reference temperature at block 402. The unit 20 is also in communication with the ambient air temperature sensor 225, which senses an ambient air temperature. The required cooling temperature differential 720 is determined by the lower of the return air reference temperature, the discharge air reference temperature, and the ambient air temperature. The lowest of the three temperatures will fall within one of the sensor temperature ranges 710 in the cooling chart 700. The required cooling temperature differential 720 will be the differential that corresponds to the range in which the lowest of the three temperatures falls. In order for the cooling check portion of the short pre-trip to pass, the discharge air must be cooled below the return air reference temperature more than the required cooling temperature differential.

Assume, for example, that the return air reference temperature is 61° F., the discharge air reference temperature is 58° F., and the ambient air temperature is 72° F. Also assume, for example, that $T_A=120°$ F., $T_B=80°$ F., $T_C=70°$ F., $T_D=60°$ F., $T_E=50°$ F., $T_F=30°$ F., and $T_G=20°$ F. Further assume, for example, that $\Delta T_1=3°$ F., $\Delta T_2=6°$ F., $\Delta T_3=10°$ F., $\Delta T_4=8°$ F., $\Delta T_5=6°$ F., $\Delta T_6=4°$ F., $\Delta T_7=2°$ F., and $\Delta T_8=1°$ F. In addition, assume that the timer initiated at block 406 is a fifteen minute timer.

Since the discharge air reference temperature is the lowest of the three temperatures, the discharge air reference temperature is used to determine the required cooling temperature differential. The discharge air reference temperature of 58° F. falls in the sensor temperature range five rows from the top of chart 700 of FIG. 6 (between $T_D=60°$ F. and $T_E=50°$ F.). Therefore, the required cooling temperature differential is 6° F. At block 408, the program is determining if the discharge air temperature is greater than 6° F. below the return air temperature. At this point, the discharge air temperature (58° F.) is only 3° F. below the return air temperature (61° F.). The unit 20 continues to cool and the program continues to monitor the temperature differential between the return air and discharge air. This monitoring occurs in the loop of blocks 408, 414, and 416 in FIG. 4C. If the temperature differential between the return air and discharge air exceeds the required cooling temperature differential of 6° F. prior to the expiration of the fifteen minute timer, the program proceeds from block 408 to block 410 and short pre-trip continues. If, on the other hand, the temperature differential between the return air and discharge air does not exceed the required cooling temperature differential of 6° F. prior to the expiration of the fifteen minute timer, the program proceeds from block 414 to block 418 where the program will eventually display pre-trip failed (block 432) on the user display or interface.

Although particular embodiments of the present invention have been shown and described, other alternative embodiments will be apparent to those skilled in the art and are within the intended scope of the present invention.

The invention claimed is:

1. A method of performing a diagnostic check on a temperature control unit, the method comprising:
    initiating a first operation of the unit;
    monitoring at least one function of the unit during the first operation;
    storing information relating to the at least one monitored function of the unit from the first operation;
    determining from the information relating to the at least one monitored function whether the unit has at least one malfunction during the first operation;
    setting a flag to one of a first setting and a second setting during the first operation, the flag being set to the first setting if the unit has no malfunction during the first operation and the flag being set to the second setting if the unit has at least one malfunction during the first operation;

terminating the first operation of the unit;

enabling the diagnostic check after termination of the first operation when the flag is set to the first setting; and enabling a second operation of the unit if the diagnostic check does not determine that the unit has a malfunction that prevents the diagnostic check from completing.

2. The method as claimed in claim 1, wherein the temperature control unit is a transport temperature control unit.

3. The method as claimed in claim 1, wherein the at least one function generates at least one alarm code, and wherein monitoring includes monitoring the at least one alarm code.

4. The method as claimed in claim 1, wherein the at least one function is a defrost cycle, and wherein monitoring includes monitoring the defrost cycle.

5. The method as claimed in claim 1, wherein the at least one function is a control sensor temperature of a control sensor, and wherein monitoring includes monitoring the at least one control sensor temperature of the control sensor and determining includes determining whether the control sensor temperature is within a predetermined range of a thermal setpoint, the unit not having a malfunction if the control sensor temperature is within the predetermined range of the thermal setpoint, the unit having at least one malfunction if the control sensor temperature is not within the predetermined range of the thermal setpoint.

6. The method as claimed in claim 5, wherein the control sensor is one of a return air temperature sensor and a discharge air temperature sensor, and the control sensor temperature is one of a return air temperature and discharge air temperature.

7. The method as claimed in claim 1, wherein storing includes storing a control sensor reference temperature of a control sensor and determining includes determining an appropriate temperature change and an appropriate time period based on the control sensor reference temperature, determining also includes determining whether the unit changes the control sensor temperature the appropriate temperature change within the appropriate time period, time unit having a malfunction if the control sensor temperature does not change the appropriate temperature change within the appropriate time period, and the unit not having a malfunction if the control sensor temperature changes the appropriate temperature change within the appropriate time period.

8. The method as claimed in claim 1, wherein the diagnostic check includes initiating a cooling check and monitoring a return air temperature, a discharge air temperature, and an ambient air temperature of a return air temperature sensor, discharge air temperature sensor, and an ambient air temperature sensor, respectively, alter the cooling check is initiated.

9. The method as claimed in claim 8, wherein the diagnostic check further includes determining a cooling temperature differential based on the lowest of the return air temperature, the discharge air temperature, and the ambient air temperature, the cooling temperature differential representing a temperature difference between the return air temperature and the discharge air temperature, wherein the diagnostic check further includes continuously monitoring the return air temperature via the return air temperature sensor and the discharge air temperature via the discharge air temperature sensor, determining a continuously monitored return air temperature and discharge air temperature differential with the continuously monitored return air temperature and discharge air temperature, and determining if the continuously monitored return air temperature and discharge air temperature differential is greater than or equal to the appropriate cooling temperature differential within a predetermined period of time, the unit having at least one malfunction if the continuously monitored return air temperature and discharge air temperature differential is not greater than or equal to the appropriate cooling temperature differential within the predetermined period of time, and the unit not having a malfunction if the continuously monitored return air temperature and discharge air temperature differential is greater than or equal to the appropriate cooling temperature differential within the predetermined period of time.

10. The method as claimed in claim 1, wherein the diagnostic check includes initiating a heating check and monitoring a return air temperature and a discharge air temperature with a return air temperature sensor and a discharge air temperature sensor.

11. The method as claimed in claim 10, wherein the diagnostic check further includes determining if the discharge air temperature is greater than the return air temperature by a predetermined amount within a period of time, the unit having at least one malfunction if the discharge air temperature is not greater than the return air temperature by the predetermined amount within the period of time, and the unit not having a malfunction if the discharge air temperature is greater than the return air by the predetermined amount within the period of time.

12. The method as claimed in claim 1, wherein the diagnostic check initiates a cooling check and a heating check.

13. The method as claimed in claim 12, wherein the diagnostic check passes when both the cooling check and the heating check pass.

14. The method as claimed in claim 1, wherein the diagnostic check only checks cooling and heating operations of the unit.

15. The method as claimed in claim 1, wherein enabling the diagnostic check includes enabling the diagnostic check only when the flag is set to the first setting.

16. The method as claimed in claim 1, wherein the diagnostic check is a first diagnostic check, the method further comprising enabling a second diagnostic check after termination of the first operation when the flag is set to either of the first setting and the second setting, the first diagnostic check consuming a shorter period of time to successfully complete than the second diagnostic check.

17. A method of diagnosing a temperature control unit, the method comprising:

initiating operation of the unit;

monitoring at least one function of the unit during operation of the unit;

storing information relating to the at least one monitored function of the unit from the operation of the unit;

determining from the information relating to the at least one function whether the unit has at least one malfunction during the operation of the unit;

terminating operation of the unit; and enabling at least one of a first diagnostic check and a second diagnostic check on the unit after termination of operation of the unit, the first diagnostic check being enabled if the unit had no malfunction during operation of the unit and the second diagnostic check being enabled whether the unit had no malfunction or the unit had at least one malfunction during operation of the unit, wherein the first diagnostic check consumes a shorter period of time to successfully complete than the second diagnostic check.

18. The method as claimed in claim 17, wherein the temperature control unit is a transport temperature control unit.

19. The method as claimed in claim 17, further comprising setting a flag to one of a first setting and a second setting during operation of the unit, the flag being set to the first setting if the unit has no malfunction during operation of the unit and the flag being set to the second setting if the unit has at least one malfunction during operation of the unit.

20. The method as claimed in claim 19, wherein enabling includes enabling at least one of the first diagnostic check and the second diagnostic check, the first diagnostic check being enabled when the flag is set to the first setting and the second diagnostic check being enabled when the flag is set to either of the first setting and the second setting.

21. The method as claimed in claim 17, wherein the first diagnostic check includes a cooling check and a heating check.

22. The method as claimed in claim 21, wherein the first diagnostic check passes when both the cooling check and the heating check pass.

23. The method as claimed in claim 17, wherein the first diagnostic check only checks cooling and heating operations of the unit.

24. The method as claimed in claim 17, wherein the first diagnostic check checks cooling and heating operations of the unit and the second diagnostic check checks more than the cooling and heating operations of the unit.

25. The method as claimed in claim 17, further comprising terminating the one of the first diagnostic check and the second diagnostic check, and reinitiating operation of the unit after the termination of the one of the first diagnostic check and the second diagnostic check if the unit does not have a malfunction that prevented the one of the first diagnostic check and the second diagnostic check from successfully completing.

26. A method of diagnosing a temperature control unit, the method comprising:
   initiating a first operation of the unit;
   monitoring a control temperature sensor of the unit during the first operation;
   storing a control sensor reference temperature of the control sensor from the first operation;
   determining an appropriate temperature change and an appropriate time period based on the control sensor reference temperature;
   determining whether the unit changes the control sensor temperature the appropriate temperature change within the appropriate time period, the unit having a malfunction if the control sensor temperature does not change the appropriate temperature change within the appropriate time period, and the unit not having a malfunction if the control sensor temperature changes the appropriate temperature change within the appropriate time period;
   terminating the first operation of the unit;
   enabling one of a first diagnostic check and a second diagnostic check after termination of the first operation of the unit, based on whether the unit had a malfunction during the first operation, wherein the first diagnostic check is enabled when the unit had no malfunction during the first operation and wherein the second diagnostic check is enabled whether the unit had no malfunction or at least one malfunction during the first operation, the first diagnostic check only checking cooling and heating operations of the unit and the second diagnostic check checking more than the cooling and heating operations of the unit;
   initiating the one of the first diagnostic check and the second diagnostic check; and
   initiating a second operation of the unit if the unit does not have a malfunction that prevented the one of the first diagnostic check and the second diagnostic check from successfully completing.

27. The method as claimed in claim 26, wherein the control sensor is one of a return air temperature sensor and a discharge air temperature sensor, and the control sensor temperature is one of a return air temperature and discharge air temperature.

28. The method as claimed in claim 26, wherein the temperature control unit is a transport temperature control unit.

29. The method as claimed in claim 26, further comprising setting a flag to one of a first setting and a second setting during the first operation of the unit, the flag being set to the first setting if the unit had no malfunction during the first operation of the unit and the flag being set to the second setting if the unit had at least one malfunction during the first operation of the unit, and wherein enabling includes enabling the first diagnostic check when the flag is set to the first setting and enabling the second diagnostic check when the flag is set to the second setting.

30. The method as claimed in claim 26, wherein the first diagnostic check passes when both the cooling and heating operations pass without a malfunction.

* * * * *

UNITED STATES PATENT AND TRADEMARK OFFICE
CERTIFICATE OF CORRECTION

PATENT NO. : 6,996,997 B2  Page 1 of 1
APPLICATION NO. : 10/382161
DATED : February 14, 2006
INVENTOR(S) : Jay L. Hanson, James W. Wiff and Bill A. Carlson It is certified that error appears in the above-identified patent and that said Letters Patent is hereby corrected as shown below:

Title page,
Item [12], delete "Wiff et al." and replace with -- Hanson et al. --.
Item [75], Inventors, should read as follows:
-- Jay L. Hanson, Bloomington, MN (US);
  James W. Wiff, Cologne, MN (US);
  Bill A. Carlson, Cottage Grove, MN (US) --.

Signed and Sealed this

Twentieth Day of June, 2006

JON W. DUDAS
*Director of the United States Patent and Trademark Office*